United States Patent
Shiga et al.

(10) Patent No.: US 7,266,659 B2
(45) Date of Patent: Sep. 4, 2007

(54) MEMORY DEVICE SYSTEM, STORAGE DEVICE, AND LOG RECORDING METHOD

(75) Inventors: Kenta Shiga, Kanagawa (JP); Toshihiko Murakami, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 11/180,594

(22) Filed: Jul. 14, 2005

(65) Prior Publication Data
US 2006/0236053 A1    Oct. 19, 2006

(30) Foreign Application Priority Data
Apr. 13, 2005  (JP) .............................. 2005-115921

(51) Int. Cl.
*G06F 12/14* (2006.01)
(52) U.S. Cl. ...................... 711/163; 711/154
(58) Field of Classification Search ................ 711/154, 711/163
See application file for complete search history.

(56) References Cited

U.S. PATENT DOCUMENTS
2002/0147891 A1*  10/2002  Saulsbury et al. .......... 711/154

FOREIGN PATENT DOCUMENTS
JP            5-274093          10/1993

* cited by examiner

*Primary Examiner*—Jack Lane
(74) *Attorney, Agent, or Firm*—Mattingly, Stanger, Malur & Brundidge, P.C.

(57) ABSTRACT

A memory device system of the present invention is equipped with a memory device comprising a first memory unit for storing data, and a second memory unit for storing an access log regarding an access to the first memory unit; a port for inputting and outputting data; a control device for writing the access log in a memory area other than the area, where the access log is already written in the second memory unit, if an access request to the first memory unit is input through the port and the access log is written in the second memory unit according to the access request, and for prohibiting a write in the second memory unit if an information write request in the second memory unit is input through the port.

16 Claims, 24 Drawing Sheets

FIG. 3A Storage Management Device
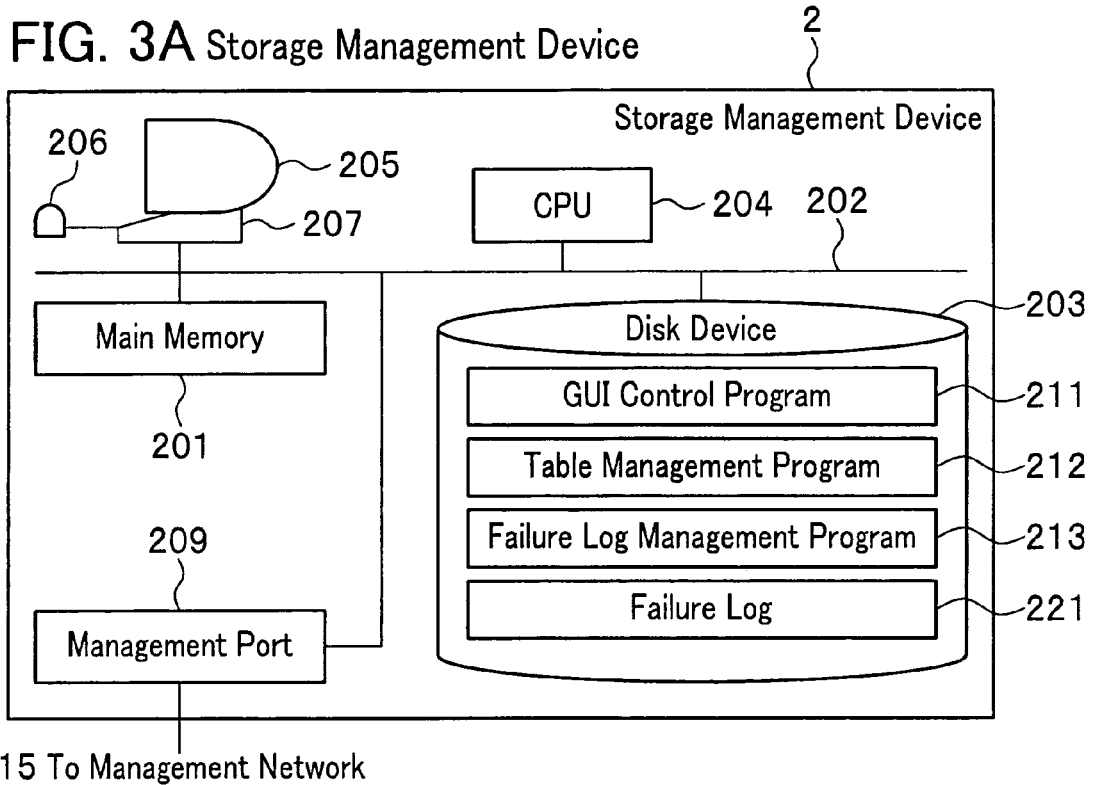
15 To Management Network
FIG. 3B Host
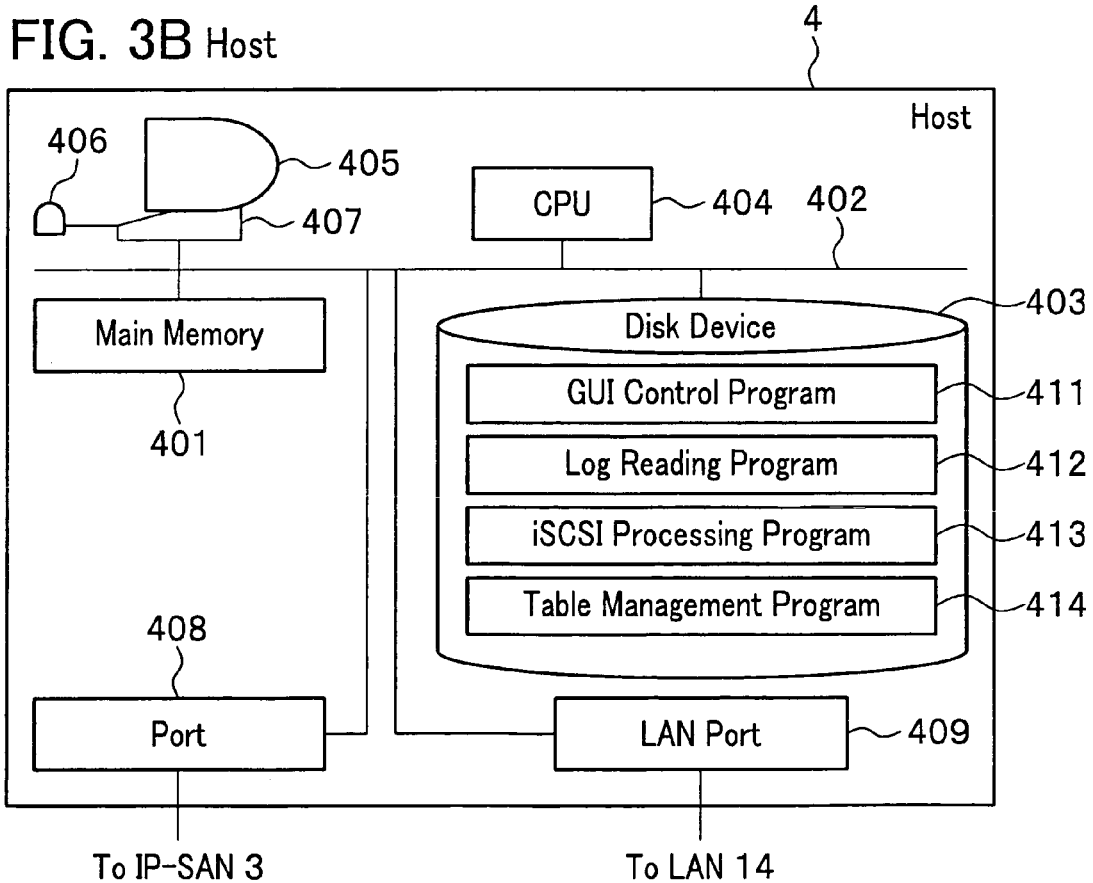
To IP-SAN 3    To LAN 14

FIG. 4A LU Table 121

| LUN | Use State | LU Type |
|---|---|---|
| 0 | Used | Normal LU |
| 1 | Unused | Normal LU |
| ... | ... | ... |
| 8 | Used | Log LU |
| ... | ... | ... |

FIG. 4B Path Table 122

| LUN | Target's iSCSI name | Initiator's iSCSI name | Port ID |
|---|---|---|---|
| 0 | iqn.1994-04.jp.co.hitachi:tar00 | iqn.1998-08.com.abc:ini00 | 0 |
| 1 | iqn.1994-04.jp.co.hitachi:tar01 | iqn.1998-08.com.abc:ini01 | 1 |
| ... | ... | ... | ... |

FIG. 4C LUN Relation Table 123

| Normal Log's LUN | Log LU's LUN |
|---|---|
| 0 | 8 |
| 1 | 9 |
| ... | ... |

FIG. 4D Log Type Table 124

| Normal Log's LUN | Log Type | Preservation Period |
|---|---|---|
| 0 | Authentication Log | 365 |
| 0 | Operation Log | 90 |
| ... | ... | ... |

FIG. 4E Authentication Table 125

| Initiator's iSCSI name | User ID | Password |
|---|---|---|
| iqn.1998-08.com.abc:ini00 | suzuki | abcd0123 |
| iqn.1998-08.com.abc:ini01 | tanaka | efgh4567 |
| ... | ... | ... |

FIG. 9

Log Type Configuration Screen

Normal LU's LUN: 1002 [dropdown] ~1001

Log to Store: ~1003

| | Log Type: | Preservation Period(day): | |
|---|---|---|---|
| 1004 | ☑ Authentication Log: | [ ] | 1007 |
| 1005 | ☐ Operation Log: | [ ] | 1008 |
| 1006 | ☐ Communication Error Log: | [ ] | 1009 |

1020 [Add]   [Delete] 1021

| Normal LU's LUN | Log Type | Preservation Period (day) | |
|---|---|---|---|
| 0 | Authentication Log | 365 | |
| 0 | Operation Log | 90 | |

~1022

[Close]

FIG.11 Authentication Log Writing Processing

FIG.12 Expiration Check Processing

FIG.15 Move Destination Storage Table 126

| Normal LU's LUN | Initiator's iSCSI name | Port ID | Target's IP Address | Target's iSCSI name |
|---|---|---|---|---|
| 0 | iqn.1994-04.jp.co.hitachi:ini00 | 0 | 192.168.0.1 | iqn.1998-08.com.xyz:tar00 |
| 1 | iqn.1994-04.jp.co.hitachi:ini01 | 1 | 192.168.0.2 | iqn.1998-08.com.xyz:tar01 |
| ... | ... | ... | ... | ... |

FIG.16

Move Destination Storage Configuration Screen

Normal LU's LUN: 1802 [ ▼ ] ~1801

Initiator's iSCSI name: 1803 [ ]

Port ID: 1805 [ ▼ ] ~1804

Target's IP Address: 1806 [ ]

Target's iSCSI name: 1807 [ ]

1810 ~ [ Add ]    [ Delete ] ~ 1811

| Normal LU's LUN | Initiator's iSCSI name | Port ID | Target's IP Address | Target's iSCSI name |
|---|---|---|---|---|
| 0 | iqn.1994-04.jp.co.hitachi:ini00 | 0 | 192.168.0.1 | iqn.1998-08.com.xyz:tar00 |
| 1 | iqn.1994-04.jp.co.hitachi:ini00 | 1 | 192.168.0.2 | iqn.1998-08.com.xyz:tar00 |

~1812

[ Close ]

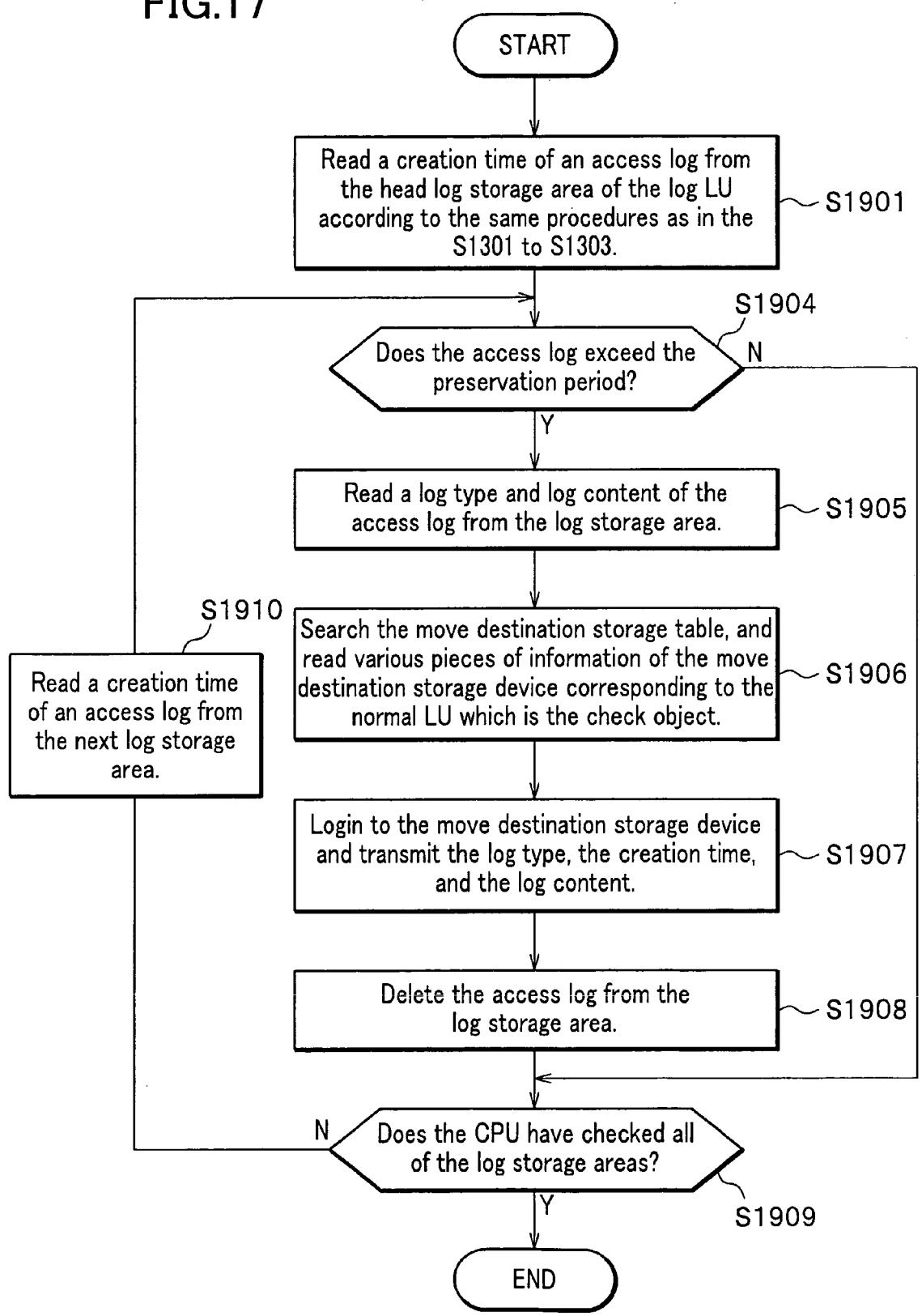
FIG.17 Expiration Check Processing

FIG.18 LU Table 121

| LUN | Use State | LU Type |
|---|---|---|
| 0 | Used | Normal LU |
| 1 | Unused | Normal LU |
| ... | ... | ... |
| 8 | Used | Log LU |
| ... | ... | ... |
| 16 | Unused | Pooled Log LU |
| 17 | Unused | Pooled Log LU |
| ... | ... | ... |

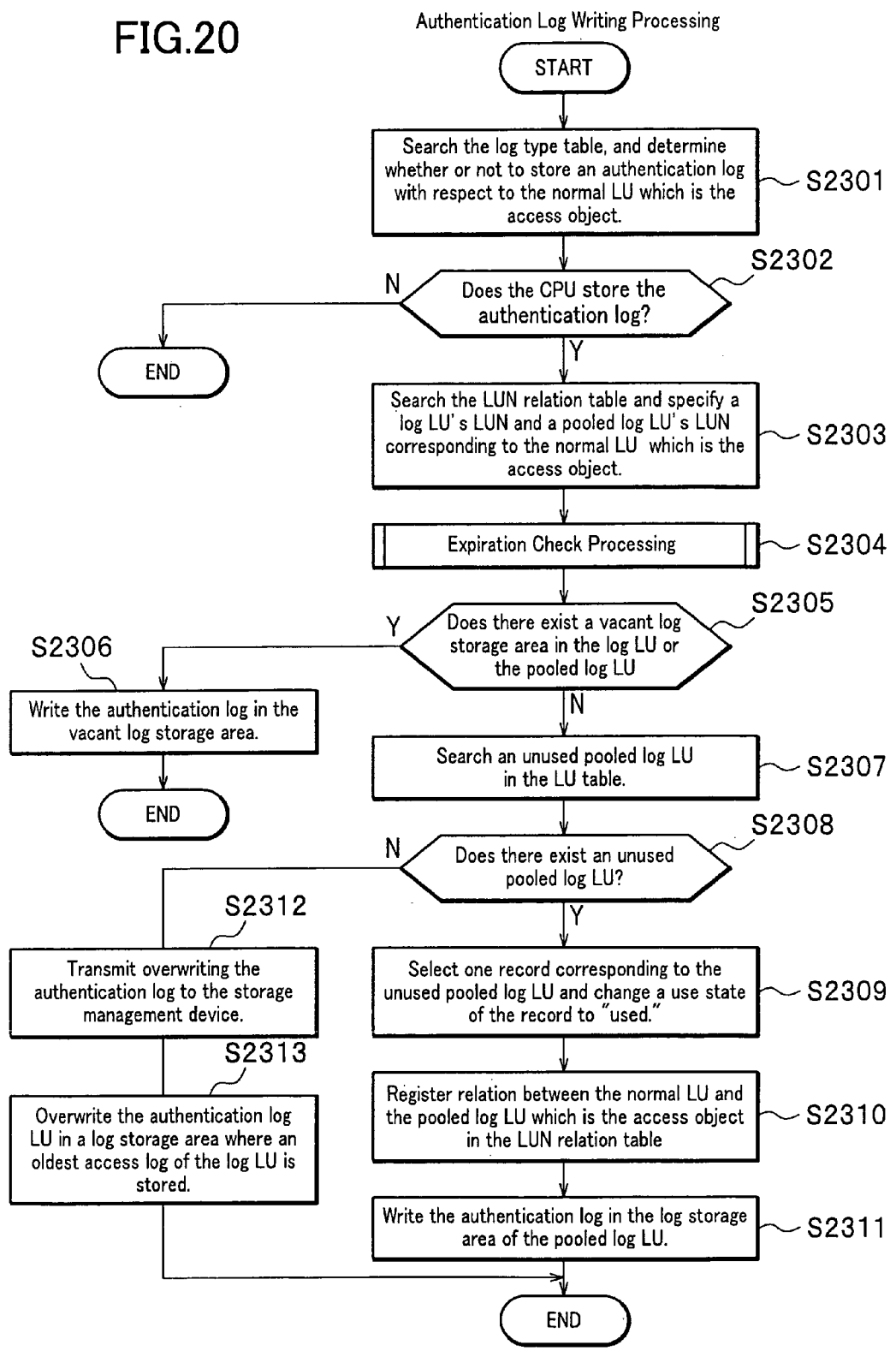

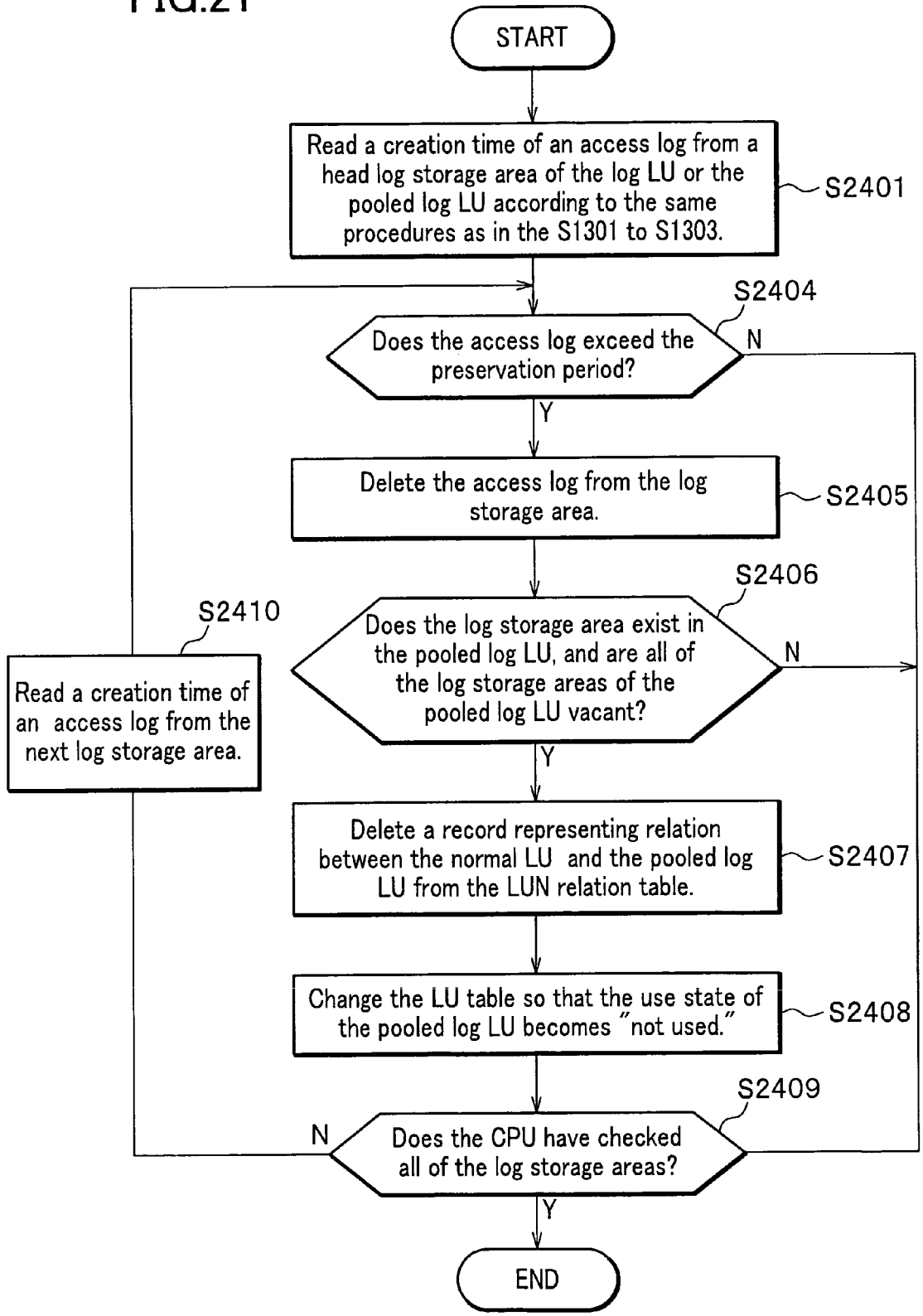

FIG.22 Access Control Table 127

| User ID | Normal LU's LUN | Log Type |
|---|---|---|
| suzuki | 0 | Operation Log |
| suzuki | 0 | Communication Error Log |
| tanaka | * | Authentication Log |
| ... | ... | ... |

FIG.23

Access Control Configuration Screen

User ID: 2602 [▼] ~2601

Normal LU's LUN: 2604 [▼] ~2603

2605 ~ [ ] All of Normal LUs

Log Type Allowed to Read:

2607 ~ [✓] Authentication Log:

2608 ~ [ ] Operation Log:

2609 ~ [ ] Communication Error Log:

2620 ~ [ Add ]    [ Delete ] ~2621

| User ID | Normal LU's LUN | Log Type | |
|---------|-----------------|----------|---|
| suzuki | 0 | Operation Log | |
| suzuki | 0 | Communication Error Log | |
| tanaka | All | Authentication Log | |

~2622

[ Close ]

MEMORY DEVICE SYSTEM, STORAGE DEVICE, AND LOG RECORDING METHOD

CROSS REFERENCE TO RELATED APPLICATIONS

This application is related to Japanese Patent Application No. 2005-115921, filed Apr. 13, 2005, which is incorporated herein by reference in its entirety.

BACKGROUND OF THE INVENTION

1. Field of the Invention

The present invention relates to a memory device system, a storage device, and a log recording method.

2. Description of the Related Art

These years there heightens a risk such as a tampering and destruction of data stored in a storage device, accompanied with the progress of IP (Internet Protocol) support by an interface of a storage device, for example, deployment of iSCSI (internet Small Computer System Interface) and NAS (Network Attached Storage). Therefore, a necessity of storing a log of an event in communications between a storage device and other devices, for example, such a log regarding success or failure of login authentication to the storage device, an administrative operation for an LU (Logical Unit) within the storage device, and an error generated in communications is heightening in order to enable security auditing of the storage device.

Conventionally, it is proposed technology of storing information about input/output failure of a magnetic disk in a memory area (failure information management file) different from the magnetic disk (see JP Hei. 5-274093). If applying the technology to a log regarding communications between a storage device and other devices, that is, storing a log of an event occurring in communications between the storage device and the other devices in a memory area of a device (for example, a storage management device) other than the storage device, it is enabled to lower possibility of third party's tampering with the log or deleting it.

But in the technology there is a problem that an administrator of a storage management device can refer to, delete, and tamper with a log stored in the memory area of the storage management device.

Consequently, it is strongly requested a memory device system, a storage device, and a log recording method for solving the problem and preventing a log of the storage device from being unjustly referred, tampered, and deleted.

SUMMARY OF THE INVENTION

A memory device system of the present invention comprises a memory device comprising a first memory unit for storing data, and a second memory unit for storing an access log regarding an access to the first memory unit; a port for inputting and outputting data; a control device for writing the access log in a memory area of the second memory unit other than the area, where the access log is already written, if an access request to the first memory unit is inputted through the port and the access log is written in the second memory unit according to the access request, and for prohibiting a write in the second memory unit if an information write request in the second memory unit is inputted through the port.

BRIEF DESCRIPTION OF THE DRAWINGS

FIG. 3A is a block diagram showing a configuration of a storage management device of FIG. 1; FIG. 3B is a block diagram showing a configuration of a host of FIG. 1.

FIG. 4A is a drawing exemplifying an LU table of FIG. 2; FIG. 4B is a drawing exemplifying a path table of FIG. 2; FIG. 4C is a drawing exemplifying a LUN relation table of FIG. 2; FIG. 4D is a drawing exemplifying a log type table of FIG. 2; and FIG. 4E is a drawing exemplifying an authentication table of FIG. 2.

FIG. 9 is a drawing exemplifying a log type configuration screen of the first embodiment.

FIG. 15 is a drawing exemplifying a move destination storage table of the second embodiment.

FIG. 16 is a drawing exemplifying a move destination configuration screen of the second embodiment.

FIG. 17 is a flowchart showing expiration check processing of an access log of a storage device of the second embodiment.

FIG. 18 is a drawing exemplifying an LU table of a third embodiment of the present invention.

FIG. 20 is a flowchart showing authentication log writing processing of a storage device of the third embodiment.

FIG. 21 is a flowchart showing expiration check processing of an access log of the storage device of the third embodiment.

FIG. 22 is a drawing exemplifying an access control table of a fourth embodiment of the present invention.

FIG. 23 is a drawing exemplifying an access control configuration screen of the fourth embodiment.

DESCRIPTION OF THE PREFERRED EMBODIMENTS

Here will be described most preferred embodiments of the present invention (hereinafter referred to as embodiments of the present invention) in detail, referring to drawings. Firstly, a first embodiment of the present invention will be described.

First Embodiment

Figure 1:
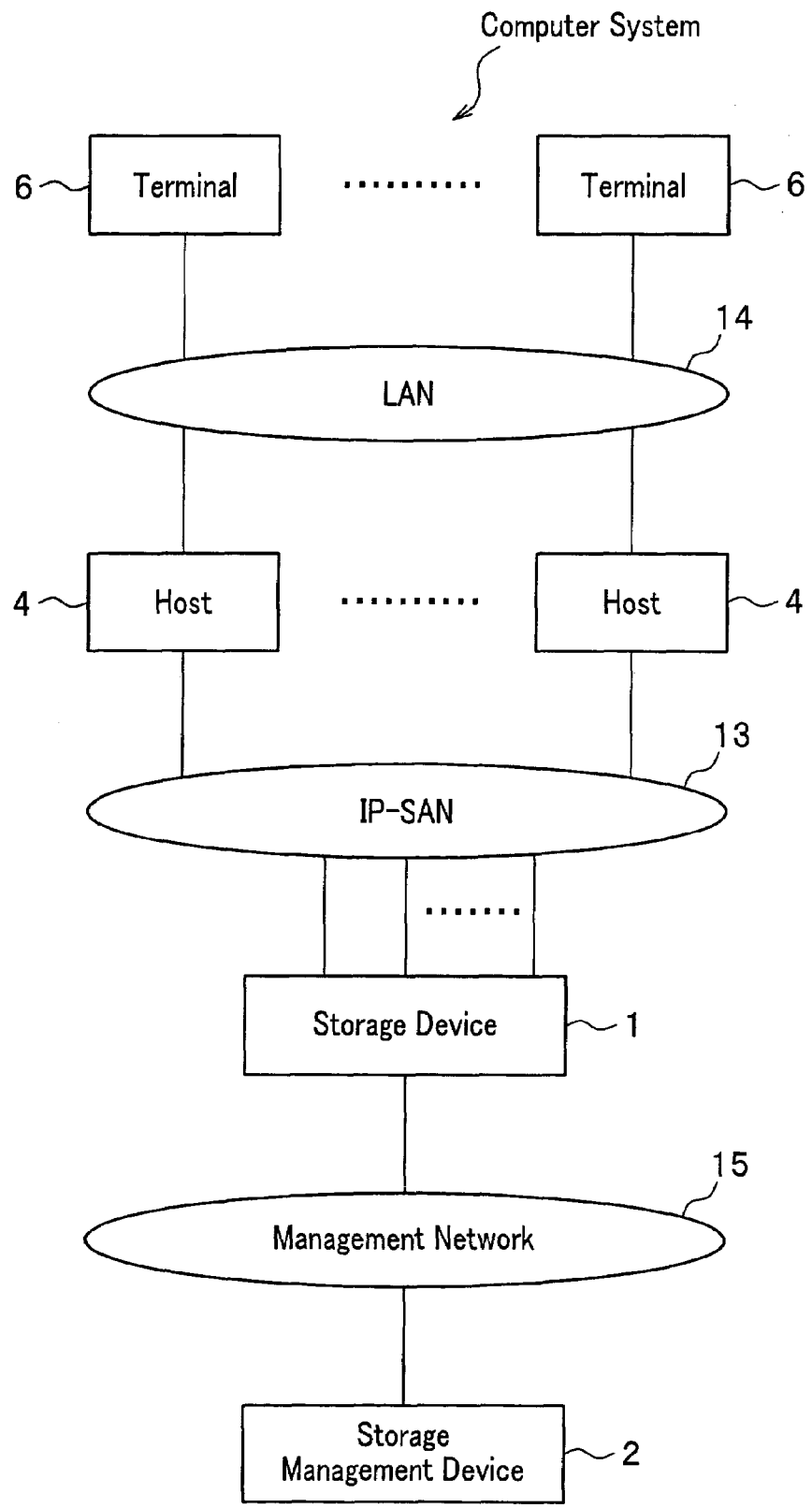
FIG. 1 is a configuration drawing of a computer system of a first embodiment of the present invention.

FIG. 1 is a general configuration drawing of a computer system of a storage device (memory device system in the "SUMMARY OF THE INVENTION") of the first embodiment.

The computer system comprises a storage device 1 comprising not less than one disk device (memory device) and a control device, hosts (host computers) 4 for communicating with the storage device 1, terminals 6 used by an end user and the like utilizing services provided by the hosts 4, and a storage management device 2 for managing the storage device 1 through a network.

Any of the hosts 4 and the storage device 1 is connected through an IP-SAN (Internet Protocol Storage Area Network) 13. In addition, the host 4 is connected to any of the terminals 6 through a LAN (Local Area Network) 14 and the like. The storage device 1 and the storage management device 2 are connected through a management network 15. It is preferable that the management network 15 is separate from the IP-SAN 13 so that an operation for the storage device 1 can be performed even if there occurs communication failure in the IP-SAN 13.

The terminal (terminal device) 6 such as a PC (Personal Computer) accesses the storage device 1 through the host 4 and the IP-SAN 13, and reads and writes various pieces of information. Then the storage device 1 records a log (hereinafter referred to as access log) regarding the access at that time. The access log is, for example, an operation log regarding an operation to a normal LU 131 from the storage management device 2, an authentication log regarding success or failure of authentication in an access to the normal LU 131 from the host 4, a communication error log regarding a communication error when the host 4 accesses the normal LU 131, and the like. The normal LU 131 will be described later.

Meanwhile, the storage device 1, the storage management device 2, the terminal 6, and the host 4 may also be designed to be connected to networks (the LAN 14, the IP-SAN 13, and the management network 15) by radio, respectively.

In addition, it is in order to avoid a mixture of a packet used in communications between the storage device 1 and the host 4 and one used in communications between the terminal 6 and the host 4 that a communication network between the storage device 1 and the host 4 is the IP-SAN 13 and one between the terminal 6 and the host 4 is the LAN 14.

Meanwhile, numbers of the terminal 6, the host 4, the storage device 1, and the storage management device 2 are not limited to numbers shown in FIG. 1.

Figure 2:
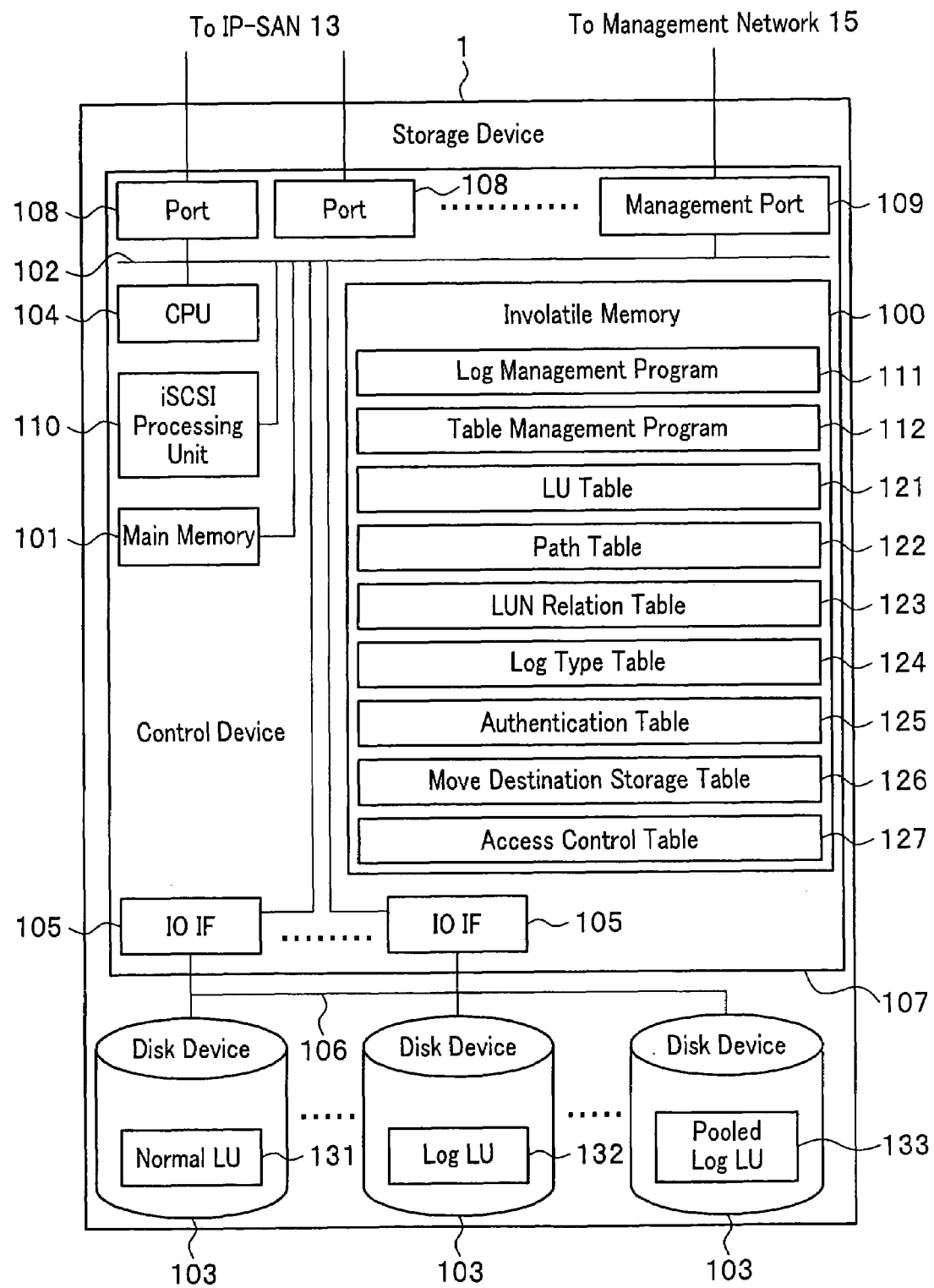
FIG. 2 is a block diagram showing a configuration of a storage device of an embodiment of the present invention.

Next will be described a configuration of the storage device 1, using FIG. 2 while referring to FIG. 1 as needed. FIG. 2 is a block diagram showing the configuration of the storage device 1 of the embodiment of the present invention.

The storage device 1 comprises a disk device 103 (memory device) not less than one and a control device 107 that performs a read from and a write in the disk device 103 and records an access log.

The control device 107 comprises ports 108 for performing data input/output through the IP-SAN 13, a management port 109 for performing data input/output through the management network 15, a CPU (Central Processing Unit) 104, an iSCSI processing unit 110 for transmitting/receiving an iSCSI command to/from the host 4 through the IP-SAN 13, a main memory 101 which is a memory area where the CPU 104 performs calculation processing, a involatile memory (memory device) 100 where various programs are stored for performing control processing of the control device 107, and IO IFs (Input/Output Interfaces) 105 for the control device 107 performing data input/output between themselves and the disk devices 103. These components are connected through a communication line 102 such a bus of the control device 107, and the IO IFs 105 and the disk devices 103 are connected through a communication line 106 such a bus. Meanwhile, although the main memory 101 and the involatile memory 100 are separately described, they may be made a same memory divided into a volatile area and an involatile area.

Although any of the disk devices 103 is generally a magnetic disk, another memory medium such as an optical disk may be used. The disk device 103 is divided into not less than one area (partition), and hereinafter the area is referred to as LU (Logical Unit). The LU where the host 4 reads and writes information through the IP-SAN 13 is referred to as a normal LU (first memory unit) 131. In addition, an area where the control device 107 records an access log is referred to as a log LU (second memory unit) 132.

Although in FIG. 2 the normal LU 131 and the log LU 132 are described as being stored in separate disk devices 103, respectively, they may also be designed to be stored in a same disk device 103, dividing an area thereof. In addition, each LU may also be designed to be stored across a plurality of the disk devices 103. Furthermore, in the plurality of the disk devices 103 a RAID (Redundant Arrays of Inexpensive Disk) configuration may also be adopted.

A log management program 111 stored in the involatile memory 100 is a program for the CPU 104 to perform processing below:
(1) writing an access log regarding communications with other devices (the host 4 and the storage management device 2) in the log LU 132;
(2) transmitting a log (hereinafter referred to as failure log) regarding a failure of any of the disk devices 103; and
(3) reading a requested log from the log LU 132 according to a log read request from the host 4 and transmitting the log read to the host 4 through the port 108.

Here, although it is in order to prevent the failure log from being not able to be written and read due to a failure of the disk device 103 that the failure log is designed to be transmitted to the storage management device 2, the failure log may also be designed to be stored in the disk device 103 of the storage device 1.

In addition, a table management program 112 stored in the involatile memory 100 is a program for the CPU 104 to perform processing below:
(1) updating various tables according to a table update request from the storage management device 2; and
(2) reading data from various tables according to a table read request from the storage management device 2, and transmitting the data to the storage management device 2.

Meanwhile, details of the various tables (an LU table 121, a path table 122, a LUN relation table 123, a log type table 124, and an authentication table 125) will be described later, using drawings. In addition, a move destination storage table 126 stored in the involatile memory 100 will be described in a second embodiment; and an access control table 127 in a fourth embodiment, respectively. Furthermore, a pooled log LU 133 of the disk device 103 will be described in a third embodiment.

The iSCSI processing unit 110 is a unit for reading and generating an iSCSI packet. The iSCSI packet is a packet where an SCSI command and data are encapsulated with TCP/IP (Transmission Control Protocol/Internet Protocol) in order to transmit and receive these command and data through the IP-SAN 13.

Although because in the embodiment a large amount of iSCSI packets between the storage device 1 and the host 4 need to be processed, the iSCSI processing unit 110 is assumed to be realized by hardware, it is also possible to store an iSCSI processing program in the involatile memory 100, and for the CPU 104 to run the iSCSI processing program.

Meanwhile, out of devices for performing communications through the IP-SAN 13, a device for transmitting a command requesting a data read/write and data to be written is called an initiator. Read/write requests for data are hereinafter referred to as an access request. On the other hand, a device for receiving the write request command and the data from the initiator, writing the data in a memory device (disk device) such as a hard disk, receiving the read request command from the initiator, and transmitting the data is called a target. In the embodiment the host 4 operates as the initiator, and the storage device 1 operates as the target. Meanwhile, the initiator and the target may plurally exist within a same host 4 and a same storage device 1, respectively.

In addition, if iSCSI is used, the initiator and the target are logically identified by an identifier called an iSCSI name. The iSCSI name is a character string independent of a physical port, and a system administrator and the like can change it.

Next will be described configurations of the storage management device 2 and the host 4, using respectively FIGS. 3A and 3B while referring to FIGS. 1 and 2. FIG. 3A is a block diagram showing the configuration of the storage management device 2 of FIG. 1.

The storage management device 2 performs various configurations to the storage device 1 through the management network 15. The storage management device 2 comprises a management port 209 for transmitting and receiving data to/from the storage device 1 through the management network 15, a CPU 204 for performing various calculation processing based on a program stored in a disk device 203, a main memory 201 which is a memory area for the CPU 204 performing the calculation processing, input devices (a mouse 206 and a keyboard 207) for inputting various pieces of information in the CPU 204, and a display device (display 205) for outputting and displaying a calculation processing result of the CPU 204 and data of the disk device 203.

The disk device 203 stores a GUI (Graphical User Interface) control program 211, a table management program 212, a failure log management program 213, and a failure log 221 regarding a failure of the disk device 103.

The GUI control program 211 is a program for the CPU 204 to perform processing below:

(1) displaying a screen for performing various configurations in the display 205;

(2) displaying calculation processing results by other programs in the display 205; and (3) enabling data input by the mouse 206 and the keyboard 207 to be processed by using other programs.

The table management program 212 is a program for the CPU 204 to perform processing below:

(1) transmitting a table read request to the storage device 1 according to an instruction issued by running the GUI control program 211, and handing over data as a result of the request obtained from the storage device 1 to the GUI control program 211; and (2) transmitting a table update request to the storage device 1 according to data issued by running the GUI control program 211.

The failure log management program 213 is a program for the CPU 204 to receive the failure log 221 of the disk device 103 from the storage device 1 and to write the log 221 in the disk device 203.

While an administrator of the storage device 1 watches a screen displayed in the display 205 of the storage management device 2, he/she inputs various pieces of information, using the mouse 206 and the keyboard 207, and performs various configurations of the storage device 1. In addition, because in the disk device 203 is stored the failure log 221 of the disk device 103 of the storage device 1, the administrator of the storage device 1 can check the failure log 221 of the disk device 103.

FIG. 3B is a block diagram showing the configuration of the host 4 of FIG. 1. The host 4 writes and reads data for the normal LU 131 of the storage device 1. In addition, the host 4 requests a log read for the LU 132, and reads various tables of the storage device 1.

The host 4 comprises a port 408 for transmitting and receiving data to/from the storage device 1 through the IP-SAN 13; a LAN port 409 for transmitting and receiving data to/from the terminal 6 through the LAN 14; a disk device 403; a CPU 404 for performing various calculation processing, based on a program stored in the disk device 403; a main memory 401 which is a memory area for the CPU 404 performing the calculation processing, input devices (a mouse 406 and a keyboard 407) for inputting various pieces of information in the CPU 404, and a display device (display 405) for outputting and displaying a calculation processing result of the CPU 404.

The disk device 403 stores a GUI control program 411, a log reading program 412, an iSCSI processing program 413, and a table management program 414. Because the GUI control program 411 is a program for the CPU 404 to perform the processing same as the GUI control program 211, and the table management program 414 is a program for the CPU 404 to perform the processing same as the table management program 212, descriptions thereof are omitted.

The log reading program 412 is a program for the CPU 404 to transmit a log read request to the storage device 1. The CPU 404 displays a log as a result of the request obtained in the display 405 according to the GUI control program 411. In addition, the iSCSI processing program 413 is a program for the CPU 404 to perform communications between the host 4 and the storage device 1 through the IP-SAN 13.

Next will be described various tables stored in the storage device 1, using FIGS. 4A to 4E while referring to FIGS. 1 to 3B.

FIG. 4A is a drawing exemplifying the LU table (first information) 121 of FIG. 2. The LU table 121 is information indicating a use state (used/unused) of an LU and an LU type (normal LU/log LU) for every LUN (Logical Unit Number) which is identification information of the LU.

For example, in FIG. 4A a second row indicates that the LU of LUN "0" is "used" now, and an LU type thereof is the "normal LU." In addition, a third row indicates that the LU of LUN "1" is "unused" now, and an LU type thereof is the "normal LU." Furthermore, a fifth row indicates that the LU of LUN "8" is "used" now, and an LU type thereof is the "log LU."

The control device 107 can determine which LU is used now and which LU is unused, by referring to such the LU table 121. In other words, if newly allocating the log LU 132 to one of the normal LUs 131, the control device 107 can determine to which normal LU 131 the log LU 132 should be allocated.

Meanwhile, in the LU table 121 in an initial state the use state of all rows is "unused," and the LU type of all rows is the "normal LU." In other words, if the CPU 104 newly allocates a log LU 132 to the normal LU 131, the CPU 104 changes the LU type of a record in the LU table 121 of which use state is "unused" to "log LU" and rewrites the use state to "used."

FIG. 4B is a drawing exemplifying the path table 122 of FIG. 2. The path table 122 is information indicating an LU's LUN used, a target's iSCSI name corresponding to the LU, an initiator's (host 4) iSCSI name that can login to the target, and an ID of the port 108 used in communications between the initiator and the target.

For example, in FIG. 4B a second row indicates that: a target's iSCSI name corresponding to the LU of LUN "0" is "iqn.1994-04.jp.co.hitachi:tar00"; an initiator's iSCSI name that can login to the target is "iqn.1998-08.com.abc:ini00"; and an ID of the port 108 used in communications between the initiator and the target is "0".

The control device 107 can make only a predetermined device (host 4) access the normal LU 131 by referring to the path table 122. In other words, the control device 107 can prevent hosts 4 other than the predetermined host 4 from accessing the normal LU 131.

FIG. 4C is a drawing exemplifying the LUN relation table 123 of FIG. 2. The LUN relation table 123 is information indicating the LUN of the normal LU 131 and that of the log LU 132 for storing an access log of the normal LU 131.

For example, in FIG. 4C a second row indicates that the LUN of the log LU 132 for storing the access log of the normal LU 131 of LUN "0; " is "8"; a third row indicates that the LUN of the log LU 132 for storing the access log of the normal LU 131 of LUN "1" is "9". Meanwhile, an access log storage destination of the normal LU 131 may also be not less than two log LUs 132. In addition, in the LUN relation table 123 may include LUNs of both log LUs 132, wherein one log LU 132 whose log storage area has already become full of access logs and where there is no area for storing them; and the other log LU 132 where an access log is written.

The control device 107 can specify which of log LUNs an access log has to be read from and which of LUNs an access log of the normal LU 131 has to be written in by referring to the LUN relation table 123.

FIG. 4D is a drawing exemplifying the log type table (second information) 124 of FIG. 2. The log type table 124 is information for indicating a type of an access log stored for each normal LU 131.

For example, in FIG. 4D second and third rows indicate that an "authentication log" and an "operation log" are stored in the log LU 132 as the access log of the normal LU 131 of LUN "0".

In addition, the log type table 124 may further include information regarding a preservation period of the access log for every normal LU 131 and every log type as shown in FIG. 4D. In other words, the log type table 124 may be a preservation period table.

For example, in FIG. 4D second and third rows indicate that: a preservation period of the authentication log of the normal LU 131 of LUN "0" is 365 (days); and similarly that of the operation log of the normal LU 131 of LUN "0" is 90 (days).

The control device 107 reads the log type table 124 and determines which type of access log is stored regarding each normal LU 131 and till when it is stored (and when it is deleted).

FIG. 4E is a drawing exemplifying the authentication table 125 of FIG. 2. The authentication table 125 is information for indicating a user ID which is user's identification information of an initiator (host 4) and a password of the user for every initiator's iSCSI name.

For example, in FIG. 4E a second row indicates that a user ID of an initiator of which iSCSI name is "iqn.1998-08.com.abc:ini00" is "suzuki", and a password thereof is "abcd0123".

If the control device 107 receives an access from an initiator (host 4) through the port 108, it reads the iSCSI name, the user ID, and the password of the initiator transmitted from the initiator at that time, and information of the authentication table 25, and performs authentication processing. Then, if the authentication succeeds, the control device 107 performs processing thereafter.

Figure 5:
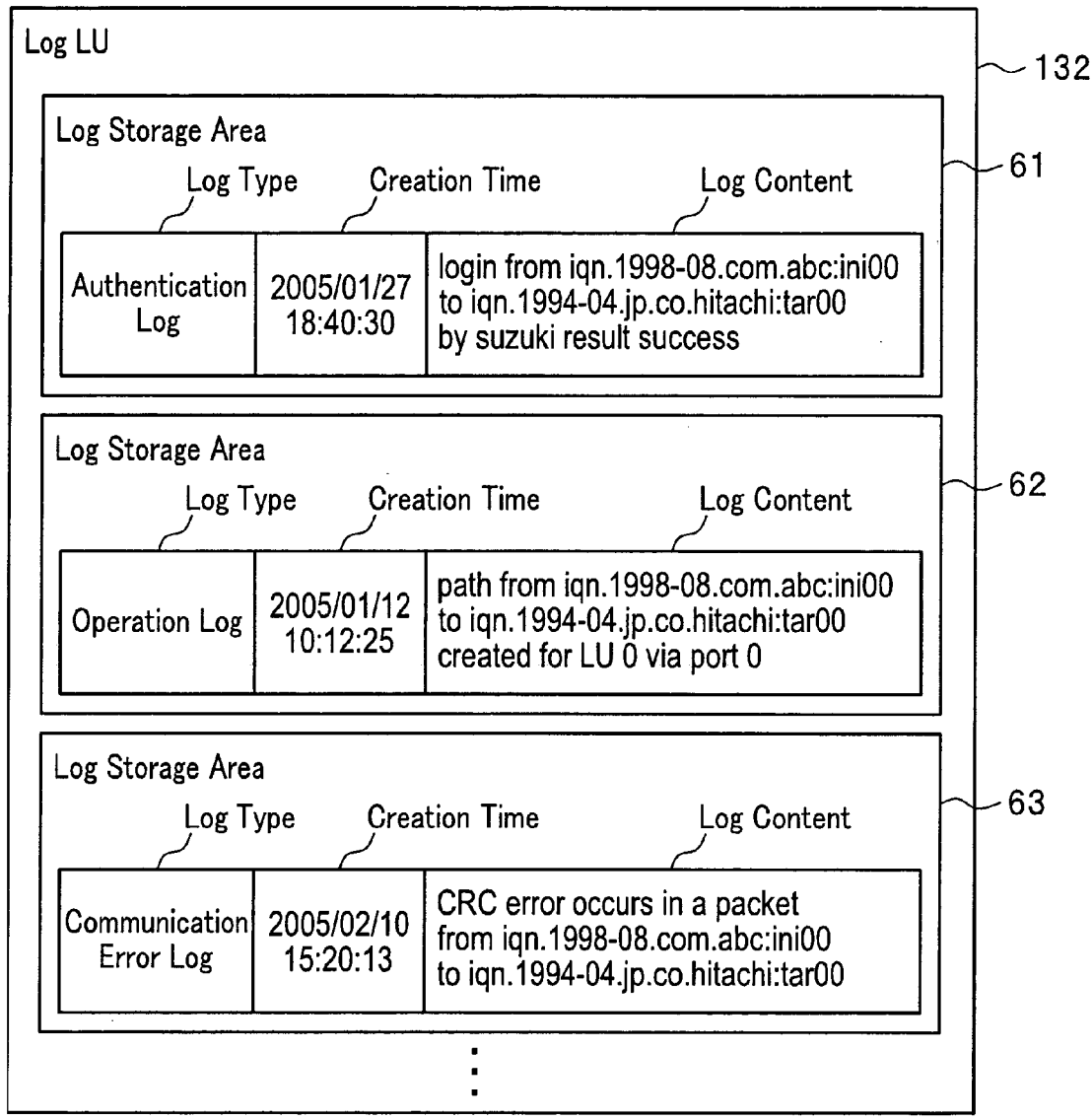
FIG. 5 is a drawing exemplifying an access log stored in log storage areas of a log LU of the first embodiment.

Next will be described an access log stored in the log LU 132, using FIG. 5. FIG. 5 is a drawing exemplifying the access log stored in a log storage area of the log LU 132 of the first embodiment. In log storage areas 61, 62, and 63 are stored a log type, log creation time, and log content of the access log.

For example, the access log of the log storage area 61 is an "authentication log" recorded at "2005/01/27 18:40:30" and indicates a content that "user suzuki succeeded in making a login to the target of the iSCSI name of iqn.1994-04.jp.co.hitachi:tar00 from the initiator of the iSCSI name of iqn. 1998-08.com.abc:ini00."

In addition, the access log of the log storage area 62 is an "operation log" recorded at "2005/01/12 10:12:25" and indicates a content that "a path is created to the target of the iSCSI name of iqn.1994-04.jp.co.hitachi:tar00 from the initiator of the iSCSI name of iqn.1998-08.com.abc:ini00 through a port whose port ID is 0."

Furthermore, the access log of the log storage area 63 is a "communication error log" recorded at "2005/02/10 15:10:13" and indicates a content that "a CRC (Cyclic Redundancy Check) error occurred at a packet to the target of the iSCSI name of iqn.1994-04.jp.co.hitachi:tar00 received from the initiator of the iSCSI name of iqn.1998-08.com.abc:ini00 through the port whose port ID is 0."

The CPU 104 generates these access logs, based on the log management program 111, and stores them in the log LU 132. Meanwhile, although the log types are here the "authentication log," the "operation log," and the "communication error log," log types other than these are also available. In addition, although in a log there exists a failure log of the disk device 103, the failure-log is stored in the storage management device 2. In addition, same as the access log, the failure log includes a log type, a log creation time, and a log content.

Figure 6:
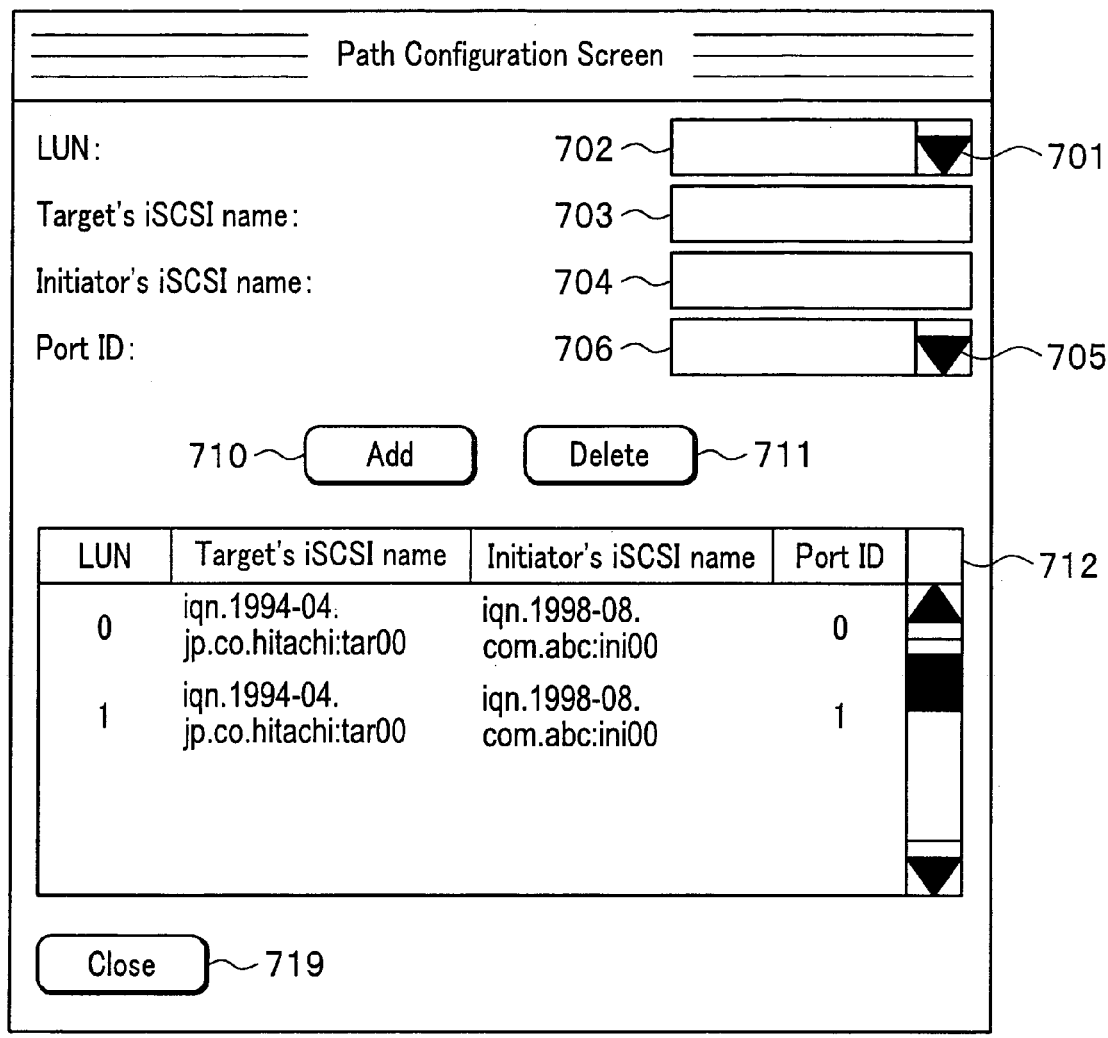
FIG. 6 is a drawing exemplifying a path configuration screen of the first embodiment.

Here will be described an update procedure of various tables stored in the involatile memory 100. Firstly, an update procedure of the path table 122, using FIG. 6 while referring to FIGS. 1 to 5. FIG. 6 is a drawing exemplifying a path configuration screen (path table update configuration screen) of the first embodiment.

If the storage management device 2 receives a display instruction of the path configuration screen from an administrator of the storage device 1 through the mouse 206 and the like, the CPU 204 builds up a table read request for reading LUNs of all normal LUs 131 unused and LUNs of log LUs 132 from the LU table 121, based on the table management program 212, and transmits the table read request to the storage device 1.

In addition, the CPU 204 builds up a table read request for reading all records from the path table 122, based on the table management program 212, and transmits the table read request to the storage device 1.

If the CPU 204 receives a response to these requests from the storage device 1, it displays the path configuration screen in the display 205, based on the GUI control program 211.

In an area 712 of FIG. 6 is displayed a content of the path table 122 received from the storage device 1. Here, if a button 701 is selected by the mouse 206 and the like, the CPU 204 displays LU's (normal LUs 131 and log LUs 132) LUNs used in the LU table 121 as a pull-down menu. Here, if an LU is selected by the mouse 206 and the like, the CPU 204 displays a LUN thereof in an area 702.

In addition, if a button 705 is selected by the mouse 206 and the like, the CPU 204 displays a list of port IDs from zero to a maximum value as a pull-down menu. Here, if a predetermined port ID is selected by the mouse 206 and the like, the CPU 204 displays the port ID in an area 706.

In addition, an area 703 is an input column of a target's iSCSI name; an area 704 is an input column of an initiator's iSCSI name. If a button 710 is selected by the mouse 206 and the like after the iSCSI names are inputted by the keyboard 207 and the like, the CPU 204 builds up a table update request for adding a record to the path table 122 according to data selected by the buttons 701 and 705 and data inputted in the areas 703 and 704, based on the table management program 212, and transmits the table update request to the storage device 1.

In addition, the CPU 204 adds a row to the area 712, based on the GUI control program 211.

Furthermore, if a LUN selected by the button 701, based on the table management program 212, is that of the normal LU 131, the CPU 204 builds up a table update request for changing the use state of the record of the LU table 121 corresponding the LUN to "used," and transmits the table update request to the storage device 1.

On the other hand, if a button 711 is selected after one row of the area 712 is selected by the mouse 206 and the like, the CPU 204 builds up a table update request for deleting from the path table 122 the record corresponding to the row selected within the area 712, based on the table management program 212, and transmits the table update request to the storage device 1. In addition, the CPU 204 deletes the selected row from the area 712, based on the GUI control program 211.

Furthermore, if the row selected within the area 712, based on the table management program 212, is relevant to the normal LU 131, the CPU 204 builds up a table update request for changing the use state of the record of the LU table 121 corresponding the row to "unused," and transmits the table update request to the storage device 1.

Thus the administrator of the storage device 1 can update the path table 122 of the storage device 1 through the storage management device 2.

Figure 7:
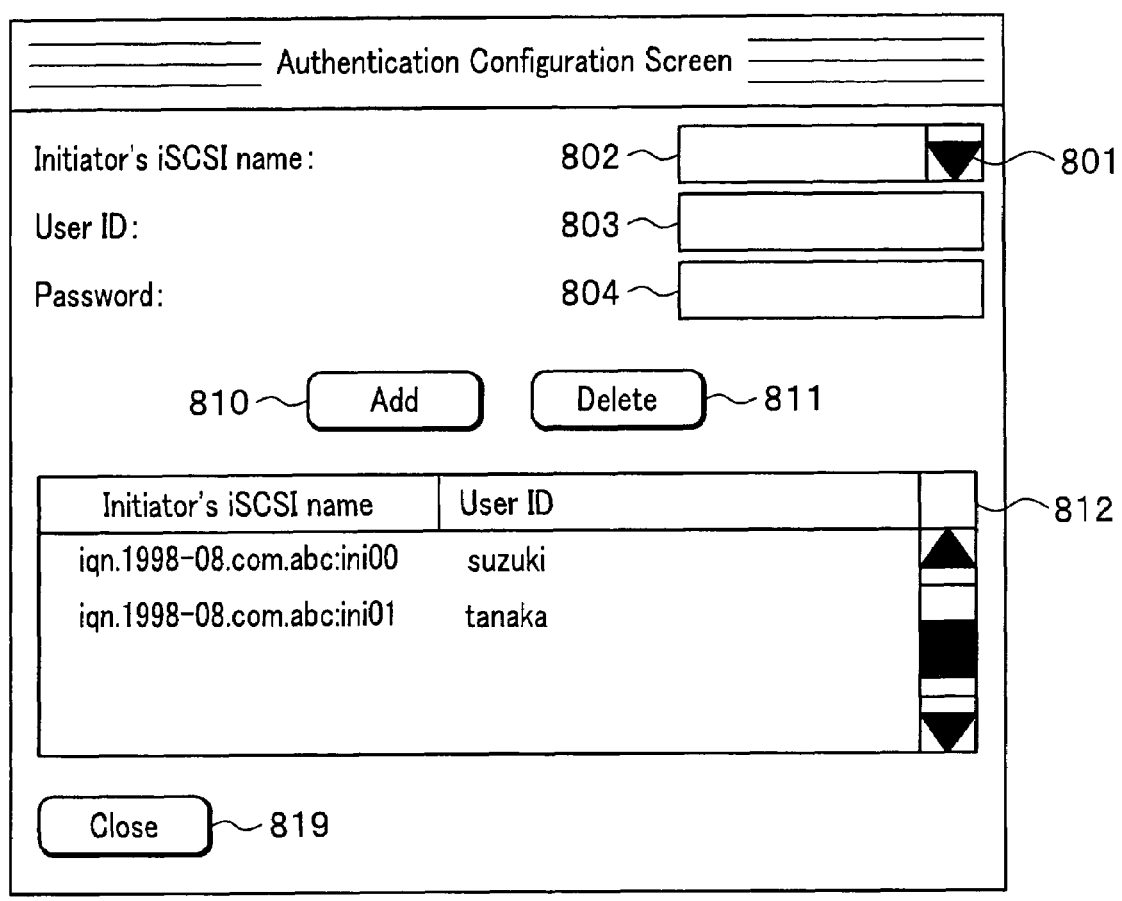
FIG. 7 is a drawing exemplifying an authentication configuration screen of the first embodiment.

Subsequently, an update procedure of the authentication table 125 will be described, using FIG. 7 while referring to FIGS. 1 to 6. FIG. 7 is a drawing exemplifying an authentication configuration screen (authentication table update screen) of the first embodiment.

If the storage management device 2 receives a display instruction of the authentication configuration screen from the administrator of the storage device 1 by the mouse 206 and the like, the CPU 204 builds up a table read request for reading all pairs of initiator's iSCSI names and user IDs from the authentication table 125, based on the table management program 212, and transmits the table read request to the storage device 1.

In addition, the CPU 204 builds up a table read request for reading all of the initiator's iSCSI names from the path table 122, and transmits the table read request to the storage device 1.

If the CPU 204 receives a response to the table read requests from the storage device 1, it displays the authentication configuration screen in the display 205, based on the GUI control program 211.

In an area 812 of FIG. 7 is displayed a content of the authentication table 125 received from the storage device 1. Here, if a button 801 is selected by the mouse 206 and the like, the CPU 204 displays a list of iSCSI names read from the path table 122 as a pull-down menu, based on the GUI control program 211. Here, if an iSCSI name is selected by the mouse 206 and the like, the CPU 204 displays the iSCSI name in an area 802.

In addition, an area 803 is an input column of a user ID, and an area 804 is an input column of a password of the user. If a button 810 is selected by the mouse 206 and the like after the user ID and the password are respectively inputted in these columns by the keyboard 207 and the like, the CPU 204 builds up a table update request for adding a record to the authentication table 125 according to data selected by the button 801 and data input in the areas 803 and 804, based on the table management program 212, and transmits the table update request to the storage device 1.

In addition, the CPU 204 adds a row to the area 812, based on the GUI control program 211.

On the other hand, if a button 811 is selected after one row of the area 812 is selected by the mouse 206 and the like, the CPU 204 builds up a table update request for deleting from the authentication table 125 a record corresponding to the row selected within the area 812, based on the table management program 212, and transmits the table update request to the storage device 1. In addition, the CPU 204 deletes the selected row from the area 812, based on the GUI control program 211.

Thus the administrator of the storage device 1 can update the authentication table 125 of the storage device 1 through the storage management device 2.

Figure 8:
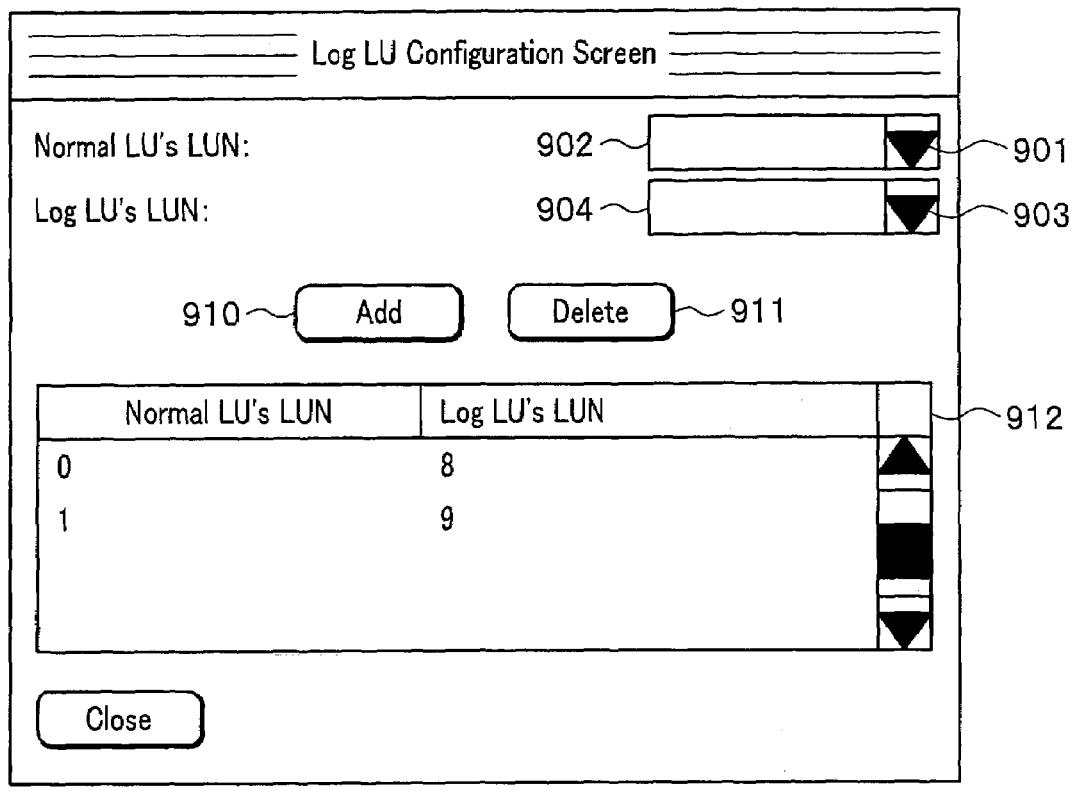
FIG. 8 is a drawing exemplifying a log LU configuration screen of the first embodiment.

Subsequently, an update procedure of the LUN relation table 123 will be described, using FIG. 8 while referring to FIGS. 1 to 7. FIG. 8 is a drawing exemplifying a log LU configuration screen (LUN relation table update screen) of the first embodiment.

If the storage management device 2 receives a display instruction of the log LU configuration screen from the administrator of the storage device 1 by the mouse 206 and the like, the CPU 204 builds up a table read request for reading all pairs of LUNs of the normal LUs 131 and the log LUs 132 from the LUN relation table 123, based on the table management program 212, and transmits the table read request to the storage device 1.

In addition, the CPU 204 builds up a table read request for reading all of LUNs of the normal LUs 131 used from the LU table 121, based on the table management program 212, and transmits the table read request to the storage device 1.

Furthermore, the CPU 204 builds up a table read request for reading all of LUNs of the normal LUs 131 unused from the LU table 121, based on the table management program 212, and transmits the table read request to the storage device 1.

If the CPU 204 receives a response to the table read requests from the storage device 1, it displays the log LU configuration screen in the display 205, based on the GUI control program 211.

In an area 912 of FIG. 8 is displayed a content of the LUN relation table 123 received from the storage device 1. Here, if a button 901 is selected by the mouse 206 and the like, the CPU 204 displays a list of LUNs of the normal LUs 131 used in the LU table 121 as a pull-down menu, based on the GUI control program 211. Here, if a predetermined LUN is selected by the mouse 206 and the like, the CPU 204 displays the LUN in an area 902.

In addition, if a button 903 is selected by the mouse 206 and the like, the CPU 204 displays a list of LUNs of the normal LUs 131 unused in the LU table 121 as a pull-down menu, based on the GUI control program 211. Here, if a predetermined LUN is selected by the mouse 206 and the like, the CPU 204 displays the LUN in an area 904.

Subsequently, if a button 910 is selected by the mouse 206 and the like, the CPU 204 builds up a table update request for adding a record to the LUN relation table 123 according to data selected by the buttons 901 and 903, based on the table management program 212, and transmits the table update request to the storage device 1.

In addition, the CPU 204 adds a row to the area 912, based on the GUI control program 211.

Furthermore, the CPU 204 builds up a table update request for changing the use state of a record and an LU type of a record, which corresponds to a LUN selected by the button 903 in the LU table 121, to "used" and "log LU," respectively, based on the table management program 212, and transmits the table update request to the storage device 1.

On the other hand, if a button 911 is selected after one row of the area 912 is selected by the mouse 206 and the like, the CPU 204 builds up a table update request for deleting from the LUN relation table 123 a record corresponding to the row selected within the area 912, based on the table management program 212, and transmits the table update request to the storage device 1. In addition, the CPU 204 deletes the selected row from the area 912, based on the GUI control program 211.

Furthermore, the CPU 204 builds up a table update request for changing the use state and an LU type of a record, which corresponds to a log LU 132 selected in the area 912 in the LU table 121, to "unused" and "normal LU," respectively, based on the table management program 212, and transmits the table update request to the storage device 1.

Thus the administrator of the storage device 1 can update the LUN relation table 123 of the storage device 1 through the storage management device 2.

Next, an update procedure of the log type table 124 will be described, using FIG. 9 while referring to FIGS. 1 to 8. FIG. 9 is a drawing exemplifying a log type configuration screen (log type table update screen) of the first embodiment.

If the storage management device 2 receives a display instruction of the log type configuration screen from the administrator of the storage device 1 by the mouse 206 and the like, the CPU 204 builds up a table read request for reading all pairs of LUNs, log types, and preservation periods of the normal LUs 131 from the log type table 124, based on the table management program 212, and transmits the table read request to the storage device 1.

In addition, the CPU 204 builds up a table read request for reading all of LUNs of the normal LUs 131 from the LUN relation table 123, based on the table management program 212, and transmits the table read request to the storage device 1.

If the CPU 204 receives a response to the requests from the storage device 1, it displays the log type configuration screen in the display 205, based on the GUI control program 211.

In an area 1022 of FIG. 9 is displayed a content of the log type table 124 received from the storage device 1. Here, if a button 1001 is selected by the mouse 206 and the like, the CPU 204 displays a list of LUNs of the normal LUs 131 read from the LUN relation table 123 as a pull-down menu, based on the GUI control program 211. Here, if a LUN is selected by the mouse 206 and the like, the CPU 204 displays the LUN in an area 1002.

Areas 1004 to 1006 are check boxes for receiving input of a log type to store; areas 1007 to 1009 are columns for receiving input of a preservation period for every log type. Here, using the mouse 206 and the keyboard 207, if a button 1020 is selected after the log type to store and the preservation period of each log are inputted, the CPU 204 builds up a table update request for adding a record to the log type table 124 according to data selected by the button 1001 and data inputted in the areas 1004 to 1009, based on the table management program 212, and transmits the table update request to the storage device 1.

In addition, the CPU 204 adds a row to the area 1022, based on the GUI control program 211. The row (data) added at this time is data inputted in the areas 1004 to 1009. The same number of records as the number of the check boxes checked of the areas 1004 to 1006 are added to the log type table 124. For example, if the areas 1004 and 1005 are checked, two records are added to the log type table 124.

On the other hand, if a button 1021 is selected after one row of the area 1022 is selected by the mouse 206 and the like, the CPU 204 builds up a table update request for deleting from the log type table 124 a record corresponding to the row selected within the area 1022, based on the table management program 212, and transmits the table update request to the storage device 1. In addition, the CPU 204 deletes the selected row from the area 1022, based on the GUI control program 211.

Thus the administrator of the storage device 1 can update the log type table 124 of the storage device 1 through the storage management device 2.

Figure 10:
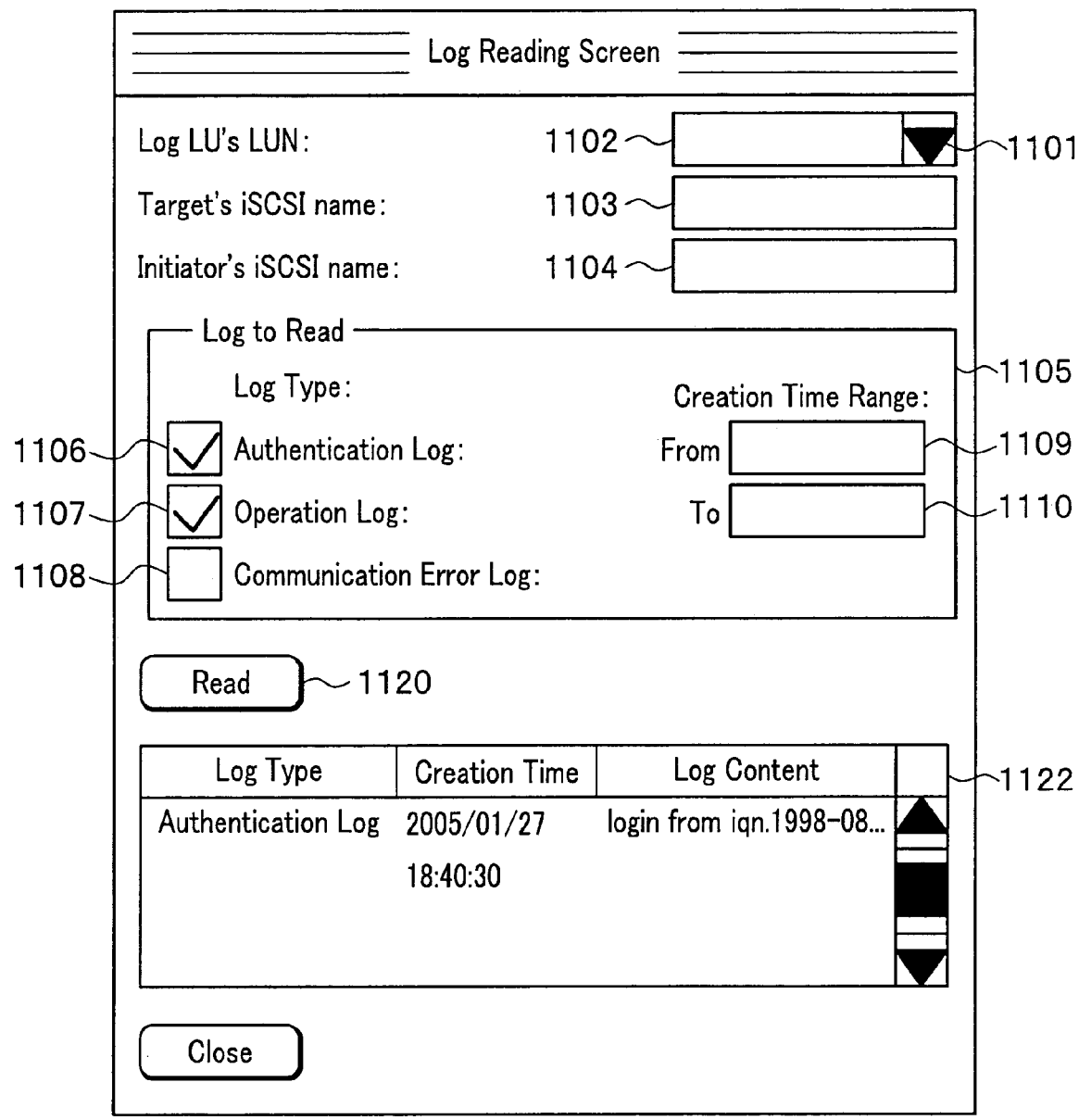
FIG. 10 is a drawing exemplifying a log reading screen of the first embodiment.

Next will be described a read procedure of an access log, using FIG. 10 while referring to FIGS. 1 to 9. FIG. 10 is a drawing exemplifying a log reading screen (screen to read the access log stored in the log LU 132) of the first embodiment. Meanwhile, a read of the access log here will be described as being mainly performed through the host 4.

If the host 4 receives a display instruction of the log reading screen from a user through the mouse 406 and the like, the CPU 404 builds up a table read request for reading all of LUNs of the log LUs 132 from the LUN relation table 123, based on the table management program 414, and transmits the table read request to the storage device 1.

If the CPU 404 receives a response to the request from the storage device 1, it displays the log reading screen in the display 405, based on the GUI control program 411.

Here, if a button 1101 is selected by the mouse 406 and the like, the CPU 404 displays a list of LUNs of the log LUs 132 read from the LUN relation table 123 as a pull-down menu, based on the GUI control program 411. Here, if a predetermined LUN is selected by the mouse 406 and the like, the CPU 404 displays the LUN in an area 1102.

In addition, an area 1103 is an input column of a target's iSCSI name corresponding to the log LU 132 selected by the button 1101; an area 1104 is an input column of an initiator's (host 4) iSCSI name.

Areas 1006 to 1008 are check boxes for receiving selection input of a log type to read; areas 1009 and 1010 are columns for receiving input of a log creation time range. Here, if a button 1120 is selected by the mouse 406 and the like after the log type to read and the log creation time range are input by the mouse 406 and the keyboard 407, the CPU 404 builds up a log read request according to data selected by the button 1101 and data inputted in the areas 1103 to 1110, based on the log reading program 412, and transmits the log read request to the storage device 1. Then, if the CPU 404 receives a response (access log) for the log read request from the storage device 1, it displays the access log received in an area 1122, based on the GUI control program 411.

Thus each user can read the access log of the storage device 1 through the host 4.

Figure 11:
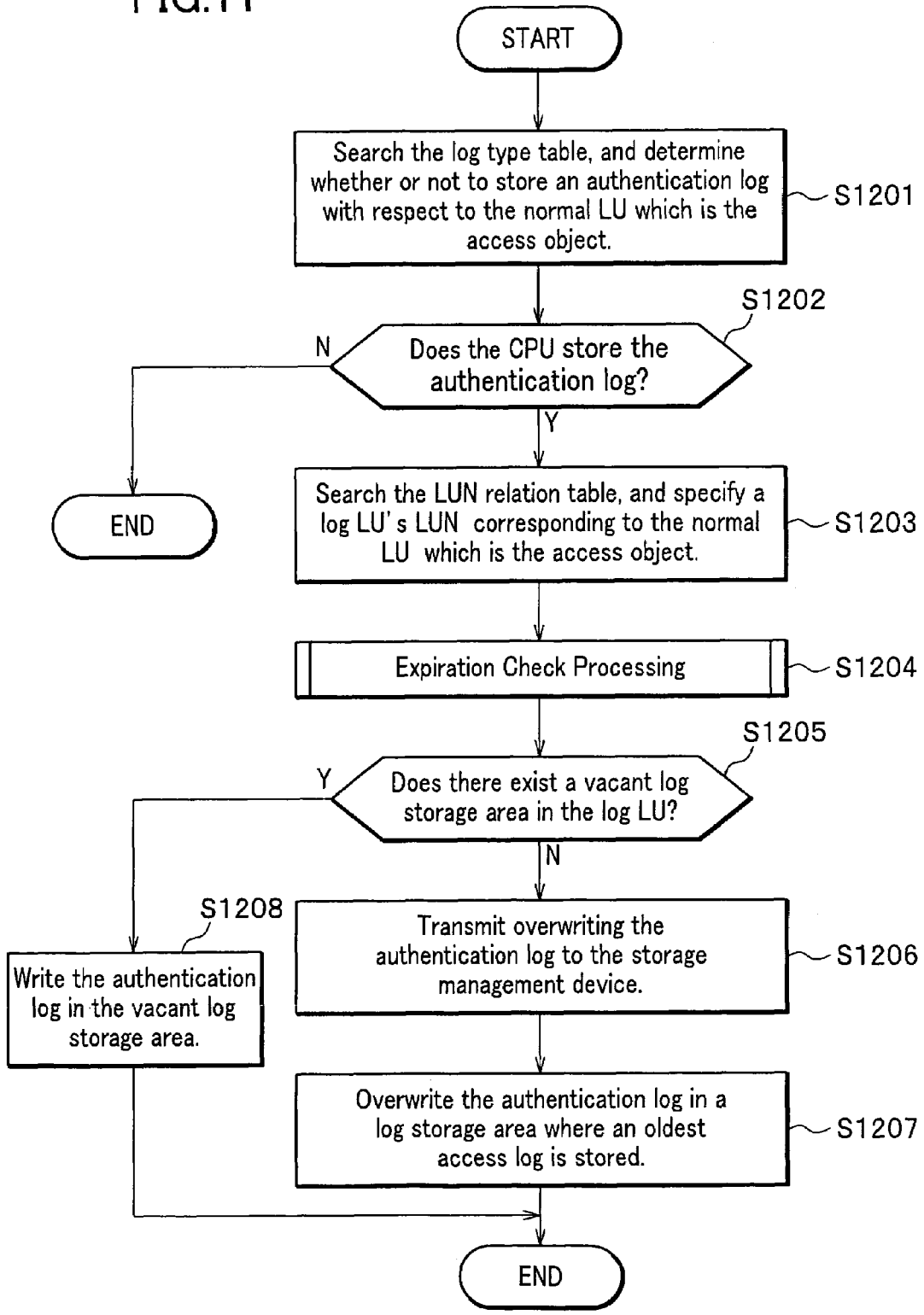
FIG. 11 is a flowchart showing authentication log writing processing of the storage device of the first embodiment.

Next will be described processing that the CPU 104 performs, based on the log management program 111. Firstly, access log writing processing performed by the CPU 104 will be described, based on the log management program 111, using FIG. 11 while referring to FIGS. 1 to 10. FIG. 11 is a flowchart showing authentication log writing processing of the storage device 1 of the first embodiment.

Firstly, if the host 4 which operates as an initiator attempts to login to the target (storage device 1) through the IP-SAN 13 (see FIG. 1) and the port 108, the CPU 104 performs authentication processing of the initiator. The authentication processing is performed by reading an initiator's iSCSI name, a target's iSCSI name, a user ID, and a password transmitted when the initiator makes the login; and the authentication table 125 and the path table 122. Then the CPU 104 specifies a LUN of one of the normal LUs 131 corresponding to the target's iSCSI name, searches the log type table 124, using the LUN of the normal LU 131 as a key, and determines whether or not to store the authentication log (result of the authentication processing) with respect to the normal LU 131 of an access object (the target) (S1201).

Here, if the CPU 104 determines not to store the authentication log (N in S1202), that is, if there exists no description of an "authentication log" in the log type of the normal LU 131 in the log type table 124, it ends the authentication log writing processing.

On the other hand, if the CPU 104 determines to store the authentication log (Y in S1202), it searches the LUN relation table 123 using the LUN of the normal LU 131 as a key, and specifies a LUN of the log LU 132 corresponding to the normal LU 131 which is the access object (S1203).

In addition, after having specified the LUN of the log LU 132 corresponding to the normal LU 131 which is the access object in the S1203, the CPU 104 may check whether or not there exists a log of which preservation period has elapsed in the log LU 132 which has the LUN, and perform processing (expiration check processing in S1204) of deleting the log of which preservation period has elapsed. Thus, even if a vacant log storage area goes out of existence in the log LU 132, it is enabled to continuously write the log. A detail of the expiration check processing will be described later, using FIG. 12.

Next, the CPU 104 determines whether or not there exists the vacant log storage area in the log LU 132 which has the LUN specified in the S1203 (S1205). Here, if the CPU 104 determines that there exists the vacant log storage area in the log LU 132 which has the LUN (Y in the S1205), it writes an authentication log in the vacant log storage area (S1208). In other words, the CPU 104 prohibits a write of the access log in a log storage area already written, and is adapted to write the access log in the log storage area other than that. Namely, the CPU 104 is adapted to permit only an additional write of information for the log LU 132. By the control device 107 performing such write control in the disk device 103, even the administrator of the storage device 1 results in being not able to tamper with or delete the access log stored in any of the log LUs 132.

On the other hand, if the CPU 104 determines that there exists no vacant log storage area in the log LU 132 which has the LUN specified in the S1203 (N in the S1205), it notifies (transmits) the storage management device 2 of overwriting the authentication log in the log LU 132 through the management port 109 (S1206). This is to notify the administrator of the storage device 1, for example, of an access log that must be stored in the log LU 132 during a preservation period being vanished by overwriting. Next, the CPU 104 overwrites the authentication log in a log storage area where an oldest access log is stored out of access logs stored in the log LU 132 (S1207). Thus the authentication log writing processing ends.

Meanwhile, the determination whether or not there exists the vacant log storage area in the S1205 may be one whether or not a capacity of the vacant log storage area becomes not more than a predetermined threshold value. In other words, if the capacity of the vacant log storage area becomes not more than the predetermined threshold value, the CPU 104 may overwrite the authentication log in a log storage area where the oldest access log is stored.

Although the authentication log writing processing is described here, writing processing of the operation log and the communication error log is same. In addition, it is assumed that when the CPU 104 writes an access log in a log storage area, it also writes information regarding an access log type and a creation time of the access log (see FIG. 5).

In other words, if an input operation for the normal LU 131 is performed from the storage management device 2, the CPU 104 writes the operation log in the log LU 132 in the same processing procedure as the procedure described above.

In addition, if an error such as a data error in communications between the host 4 (initiator) and the storage device (target) 1 occurs, the CPU 104 writes the communication error log in the log LU 132 in the same processing procedure as the procedure described above.

Figure 12:
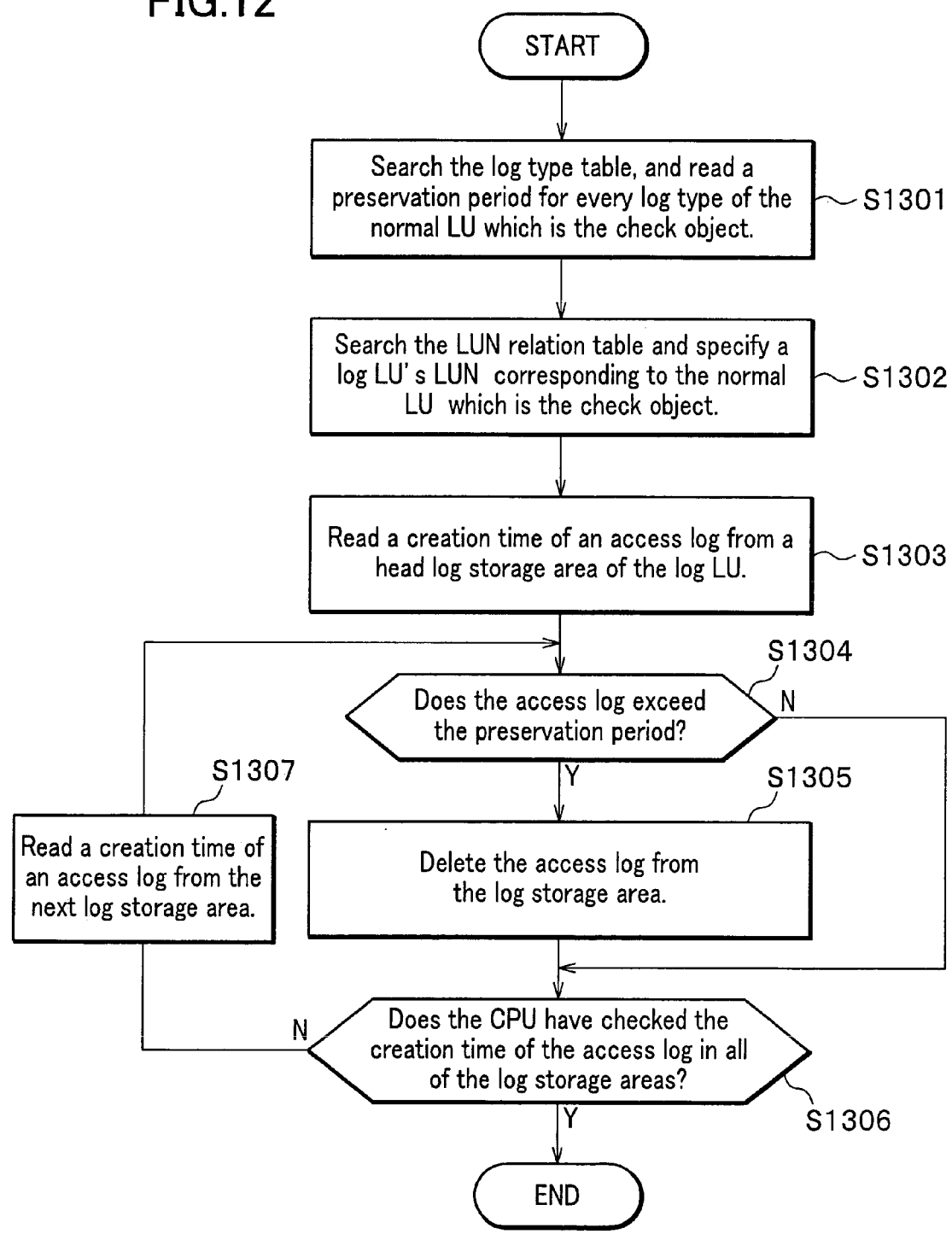
FIG. 12 is a flowchart showing expiration check processing of the access log of the storage device of the first embodiment.

Next, the expiration check processing will be described, based on the log management program 111, using FIG. 12 while referring to FIGS. 1 to 11. FIG; 12 is a flowchart showing the expiration check processing of an access log of the storage device 1 of the first embodiment.

Firstly, the CPU 104 searches the log type table 124 and reads a preservation period for every log type of the normal LU 131 which is a check object (S1301). For example, the CPU 104 reads from the log type table 124 information that: a preservation period of an authentication log of the normal LU 131 of which LUN is "0" is 365 days; and that of an operation log thereof is 90 days. S1302 will be described later.

Then the CPU 104 reads a creation time of an access log from a head log storage area of the log LU 132 (specified in the S1203 of FIG. 12) (S1303). Then the CPU 104 compares the preservation period read from the log type table 124 with an elapse time from the creation time of the access log, and determines whether or not the access log exceeds the preservation period (S1304). In other words, the CPU 104 determines whether or not a current time a log creation time>a preservation period.

If in the S1304 the CPU 104 determines that the access log exceeds the preservation period (Y in the S1304), it deletes the access log having exceeded the preservation period from the log storage area of the log LU 132 (S1305). Then the CPU 104 proceeds to S1306.

On the other hand, if in the S1304 the CPU 104 determines that the access log does not yet exceed the preservation period (N in the S1304), it proceeds to the S1306.

Next, if the CPU 104 determines to have checked the creation time of the access log in all of the log storage area of the log LU 132 (Y in the S1306), it ends the expiration check processing. On the other hand, if the CPU 104 determines to have not checked the creation time of the access log in all of the log storage area of the log LU 132 (N in the S1306), it proceeds to S1307, reads the creation time of an access log from the next log storage area, and then performs the processing after the S1304.

Meanwhile, it is assumed that: an address (logical block address) for identifying each area is allocated to the log storage area of the log LU 132; and while the CPU 104 memorizes the address of the log storage area, of which creation time check has been finished, in the main memory 101 and the like, it sequentially checks the access log of the log LU 132. Thus the CPU 104 can determine whether or not the check of all of the log storage area of the log LU 132 has been completed It is assumed that a log storage area in embodiments described later is also checked by the same method.

Meanwhile, although the expiration check processing is described as being performed when the access log writing processing is performed in the log LU 132, it may be performed other than this timing. In other words, the CPU 104 may check the creation time of an access log of the log LU 132 at every predetermined period, and delete in advance the access log that exceeds a preservation period thereof. At this time, as shown in the S1302 of FIG. 12, the CPU 104 searches the LUN relation table 123, and performs processing of specifying a LUN of the log LU 132 corresponding to the normal LU 131 which is the check object.

Thus, by the CPU 104 deleting in advance the access log that exceeds the preservation period at every predetermined period, it becomes easy to make a vacant log storage area in the log LU 132. In other words, the CPU 104 can speedily write the access log in the log LU 132.

Figure 13:
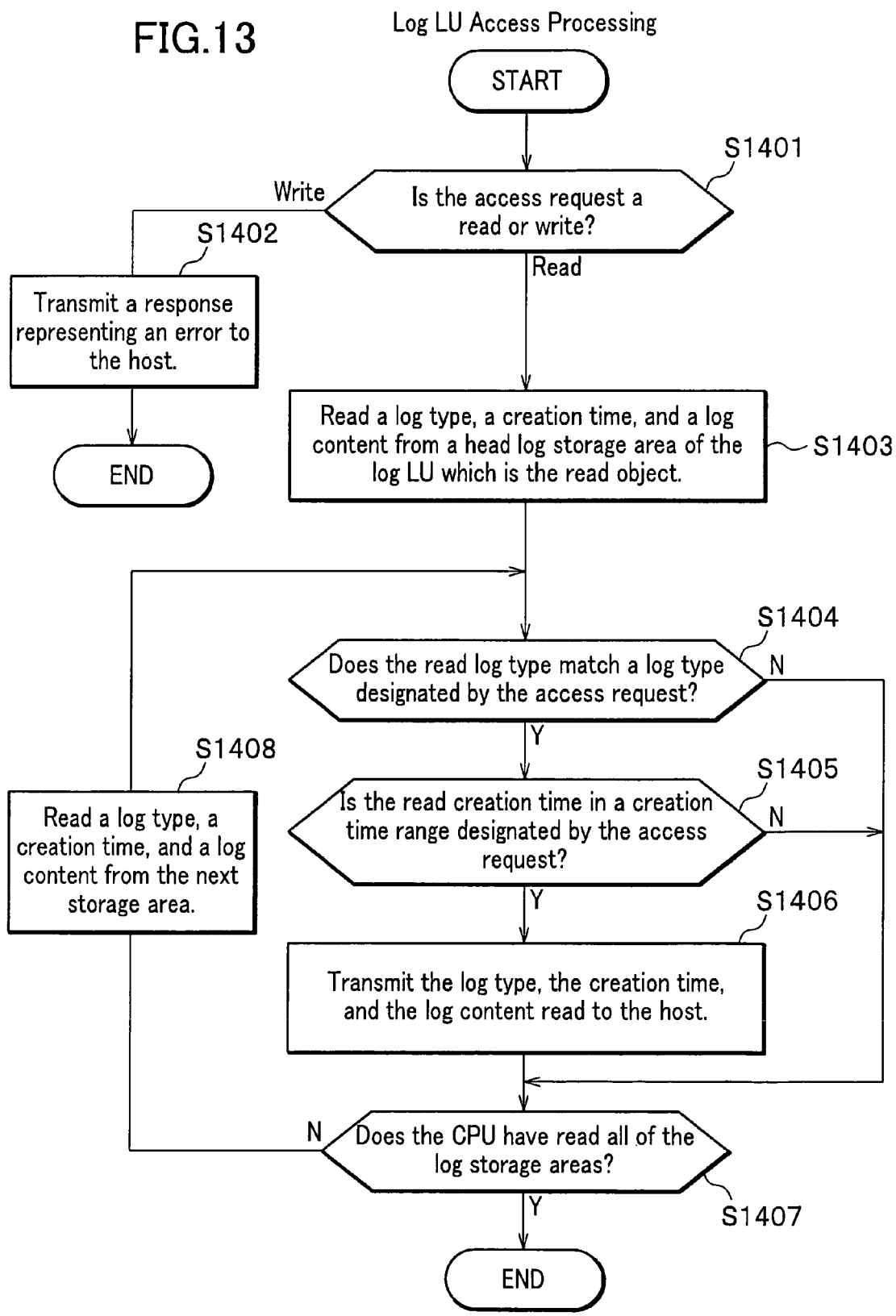
FIG. 13 is a flowchart showing access processing to the log LU of the storage device of the first embodiment.

Subsequently, access processing to the log LU 132 performed by the CPU 104 will be described, based on the log management program 111, using FIG. 13 while referring to FIGS. 1 to 12. FIG. 13 is a flowchart showing the access processing to the log LU 132 of the storage device 1 of the first embodiment.

Firstly, if the CPU 104 detects an access request to the log LU 132 from the host 4 through the port 108 (or the management port 109), it determines whether the access request requests an information write in or an information read from the log LU 132 (S1401). Here, the CPU 104 firstly reads the path table 122 (see FIG. 4B), specifies an LU's LUN where the host 4 attempts to access, and thereby determines whether the access request is for the log LU 132 or the normal LU 131. Then the CPU 104 reads the LU table 121 and determines whether the LU is the normal LU 131 or the log LU 132. If this access destination is the normal LU 131, the CPU 104 performs predetermined authentication processing, and thereafter performs the information write and the information read according to a command transmitted from the host 4. On the other hand, if the access destination is the log LU 132, the CPU 104 determines whether the access request requests an information write in or an information read from the log LU 132. Meanwhile, it is assumed that the information read request (log read request) transmitted from the host 4 includes information indicating a type and creation time and the like of an access log which is a read object.

In the S1401, if the CPU 104 determines that the access request is the information write request (the write in the S1401), it transmits a response representing an error to the host 4 (S1402).

On the other hand, in the S1401, if the CPU 104 determines that the access request is the information read request (that is, log read request) (the read in the S1401), it reads a log type, a creation time, and a log content from a head log storage area of the log LU 132 which is the read object (S1403). Then out of the access log information read in the S1403, the CPU 104 selects an access log with a log type and creation time that the host 4 requests, and transmits it to the host 4. To be more precise, the CPU 104 performs processing procedure described below:

Firstly, the CPU 104 determines whether or not the log type read in the S1403 matches a log type designated by the access request (S1404). Here, if the log type read in the S1403 matches the log type designated by the access request (Y in the S1404), the CPU 104 proceeds to S1405. On the other hand, if the log type read in the S1403 does not match the log type designated by the access request (N in the S1404), the CPU 104 proceeds to S1407.

In the S1405 the CPU 104 determines whether or not the creation time read in the S1403 is in a creation time range designated by the access request. Here, if the creation time read in the S1403 is in the creation time range designated by the access request (Y in the S1405), the CPU 104 proceeds to S1406. On the other hand, if the creation time read in the S1403 is not in the creation time range designated by the access request (N in the S1405), the CPU 104 proceeds to the S1407.

In the S1406 the CPU 104 transmits the log type, the creation time, and the log content read in the S1403 to the host 4, and determines whether or not all of log storage areas are read (the S1407). Here, if the CPU 104 has read all of the log storage areas (Y in the S1407), it ends the access processing to the log LU 132. Meanwhile, the CPU 104 may read all of the log storage area, and thereafter transmit the log type, the creation time, and the log content to the host 4 in one lump.

On the other hand, if there exists a log storage area not read yet (N in the S1407), the CPU 104 reads the log type, the creation time, and the log content from the next log storage area of the log LU 132 (S1408), and returns to the S1404.

Thus the control device 107 reads the access log from the log LU 132 according to a log read request from another device (host 4). In addition, the control device 107 transmits an error message and the like to the host 4. In the other words, although the control device 107 makes another device read the log LU 132, it does not make the device write therein. Thus it can be prevented that the access log of the storage device 1 is unjustly tampered and deleted.

Second Embodiment

Next will be described a second embodiment of the present invention. The second embodiment is characterized by moving an access log exceeding a preservation period thereof to an external storage device out of access logs of the storage device 1, and ensuring a log storage area.

Figure 14:
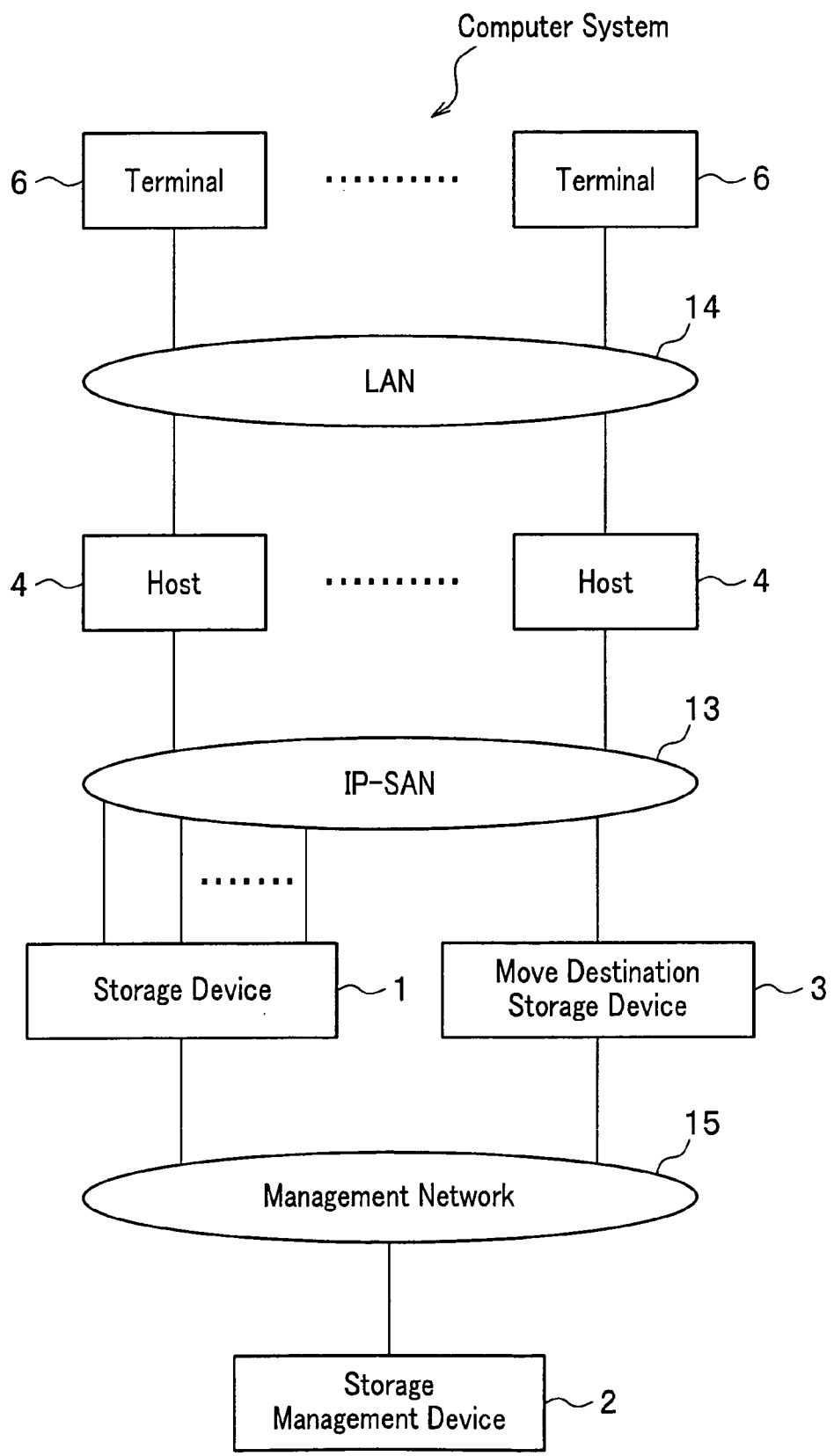
FIG. 14 is a block diagram showing a configuration of a computer system of a second embodiment of the present invention.

FIG. 14 is a block diagram showing a configuration of a computer system of the second embodiment of the present invention. Appending same symbols to components similar to those of the first embodiment, a description thereof will be omitted. A computer system of the second embodiment will be described, using FIG. 14 while referring to FIGS. 1 to 13 as needed.

As shown in FIG. 14, the computer system of the second embodiment further comprises a move destination storage device 3 which is a move destination of a log stored in the storage device 1. The move destination storage device 3 is connected to the hosts 4 through the IP-SAN 13 same as the storage device 1, and connected to the storage management device 2 through the management network 15. Because a configuration of the move destination storage device 3 is the same as the storage device 1 of the first embodiment, a detailed description thereof will be omitted.

The storage device 1 of FIG. 14 moves a log, which exceeds a preservation period thereof, to the move destination storage device 3 through the port 108 and the IP-SAN 13. In other words, the storage device 1 transmits the log, which exceeds the preservation period, to the move destination storage device 3, and thereafter deletes the log transmitted to the move destination storage device 3 from the disk device 103 of the storage device 1. Thus it is enabled to ensure a new log storage area in the disk device 103.

The storage device 1 of the second embodiment is characterized in that a move destination storage table 126 is added to the configuration of the storage device 1 of the first embodiment (see FIG. 2). The move destination storage table 126 is information indicating the move destination storage device 3 of an access log of a normal LU 131 for every normal LU 131.

FIG. 15 is a drawing exemplifying the move destination storage table 126 of the second embodiment. The move destination storage table 126 indicates an IP address and an iSCSI name of the move destination storage device 3 which operates as a target, an iSCSI name of the storage device 1 which operates as an initiator, and a LUN of the normal LU 131; and a port ID of the port 108 used in moving the access log. For example, in FIG. 15, when the access log regarding the normal LU 131 is moved from the log LU 132 to the move destination storage device 3, a first row indicates that: the initiator's iSCSI name regarding the normal LU 131 of LUN "0" is "iqn.1994-04.jp.co.hitachi:ini00"; the port ID of the port 108 used then is "0"; the IP address of the move destination storage device 3 is "192.168.0.1"; and the target's iSCSI name is "iqn.1998-08.com.xyz:tar00".

The CPU 104 reads the move destination storage table 126, based on the log management program 111, and transmits an access log, which exceeds a preservation period thereof, to the move destination storage device 3. Then the CPU 104 deletes the access log memorized in the disk device 3.

In other words, if the access log regarding the normal LU 131 of which LUN is "0" exceeds the preservation period, the CPU 104 transmits the access log to the move destination storage device 3 of which the IP address is "192.168.0.1" through the port 108 of which port ID is "0". The initiator's iSCSI name then is "iqn.1994-04.jp.co.hitachi:ini00"; the target's iSCSI name is "iqn. 1998-08.com.xyz:tar00".

Next will be described an update procedure of the move destination storage table 126, using FIG. 16 while referring to FIGS. 1 to 15. FIG. 16 is a drawing exemplifying the move destination storage configuration screen (of the move destination storage update screen) of the second embodiment. Here will be described the update of the move destination storage table 126 as being performed by instruction input in the storage management device 2.

If the storage management device 2 receives a display instruction of the move destination storage configuration screen from an administrator of the storage device 1 by the mouse 206 and the like, the CPU 204 builds up a table read request for reading all pairs of LUNs of the normal LU 131, initiator's iSCSI names, port IDs, target's IP addresses, and target's iSCSI names from the move destination storage table 126, based on the table management program 212, and transmits the table read request to the storage device 1.

In addition, the CPU 204 builds up a table read request for reading all of the LUNs of the normal LU 131 from the LUN relation table 123, based on the table management program 212, and transmits the table read request to the storage device 1.

If the CPU 204 receives a response of these requests from the storage device 1, it displays the move destination storage configuration screen in the display 205, based on the GUI control program 211.

In an area 1812 of FIG. 16 is displayed a content of the move destination storage table 126 received from the storage device 1. Here, if a button 1801 is selected by the mouse 206 and the like, the CPU 204 displays a list of LUNs of the normal LU 131 read from the LUN relation table 123 as a pull-down menu, based on the GUI control program 211. Here, if a predetermined LUN is selected by the mouse 206 and the like, the CPU 204 displays the LUN in an area 1802.

In addition, an area 1803 is an input column of an initiator's iSCSI name. In addition, if a button 1804 is selected by the mouse 206 and the like, the CPU 204 displays a list of port IDs from zero to a maximum value as a pull-down menu, based on the GUI control program 211. Here, if a predetermined port ID is selected by the mouse 206 and the like, the CPU 204 displays the port ID in an area 1805. Furthermore, an area 1806 is an input column of the target's IP address; an area 1806 is an input column of the target's iSCSI name.

If the LUN of the normal LU 131 is selected by the button 1801, the initiator's iSCSI is inputted in the area 1803, the port ID is selected by the button 1804, the target's IP address is inputted in the area 1806, the target's iSCSI name is inputted in the area 1807, and then a button 1810 is selected, the CPU 204 builds up a table update request for adding a record to the move destination storage table 126 according to data selected by buttons 1801 and 1804 and data inputted in the areas 1803, 1806, and 1807, based on the table management program 212, and transmits the table update request to the storage device 1.

In addition, the CPU 204 adds a row to the area 1812, based on the GUI control program 211.

On the other hand, if a button 1811 is selected after one row of the area 1812 is selected by the mouse 206 and the like, the CPU 204 builds up a table update request for deleting a record corresponding to the row selected within the area 1812 from the move destination storage table 126, based on the table management program 212, and transmits the table update request to the storage device 1.

In addition, the CPU 204 deletes the selected row from the area 1812, based on the GUI control program 211.

Thus the administrator of the storage device 1 can update the move destination storage table 126 by the storage management device 2.

Next will be described access log expiration check processing, using FIG. 17 while referring to FIGS. 1 to 16. FIG. 17 is a flowchart showing the access log expiration check processing of the storage device 1 of the second embodiment.

Firstly, the CPU 104 reads a creation time of an access log from a head log storage area of the log LU 132 (S1901) according to the same procedures as those of the S1301 to S1303. Then, the CPU 104 checks same as in the S1304 whether or not the access log exceeds a preservation period thereof (S1904).

The CPU 104 reads a log type and log content of the access log, which exceeds the preservation period of the log LU 132, from the log storage area of the access log (S1905). Then the CPU 104 searches the move destination storage table 126 using a LUN of the normal LU 131 which is a check object as a key, and reads various pieces of information (an initiator's iSCSI name, a port ID, an IP address, and a target's iSCSI name) of the move destination storage device 3 corresponding to the normal LU 131 (S1906).

Then the CPU 104 logins to the move destination storage device 3 through the IP-SAN 13, based on these pieces of information, and transmits the creation time of the access log read in the S1903, and the log type and log content of the access log read in the S1905 to the move destination storage device 3 (S1907).

Next the CPU 104 deletes the access log transmitted in the S1907 from the disk device103 of the storage device 1 (S1908). Then if the CPU 104 checks all of log storage areas of the log LU 132 which is the check object (Y in S1909), it ends the expiration check processing. On the other hand, if the CPU 104 determines that it has not yet checked the creation time of the access log in all of the log storage areas of the log LU 132 which is the check object (N in the S1909), it proceeds to S1910, reads a creation time of an access log from the next log storage area, and performs the processing after the S1904.

The CPU 104 may perform the expiration check processing of the log LU 132 at a predetermined period, or when it writes an access log in the log LU 132.

Thus because the storage device 1 moves an access log that exceeds a preservation period to an external storage device, it becomes easier to ensure a log storage area within the storage device 1. Meanwhile, in order to read an access log moved to the external storage device, the host 4 may later login to a target identified by the "target's iSCSI name" of the move destination storage table 126 and read the access log.

Third Embodiment

Next will be described a third embodiment of the present invention. The third embodiment is characterized in that if the storage device 1 determines there exists no vacant log storage area within the log LU 132, the CPU 104 writes an access log in a pooled log LU. Appending the same symbols to components similar to those of the embodiments, a description thereof will be omitted. Meanwhile, a general configuration of a computer system may be such one as in FIG. 1, and one comprising the move destination storage device 3 as in FIG. 14.

The storage device 1 of the third embodiment will be described, referring to FIGS. 1 to 17 as needed. A configuration of the third embodiment is characterized in that the pooled LU 133 which is a spare LU ensured for recording an access log is added to the storage device 1 of the embodiments (see FIG. 2).

In addition, the LU table 121 of the third embodiment further comprises information regarding the pooled LU 133. FIG. 18 is a drawing exemplifying the LU table 121 of the third embodiment of the present invention. In FIG. 18 seventh and eighth rows indicate, respectively, that the LUN is "16" and "17," the LU type is "pooled LU," and the current use state is "not used."

In addition, when the CPU 104 writes an access log in the pooled LU 133, in the LUN relation table 123 (see FIG. 4C) a LUN of the pooled LU 133 is written in the log LU's LUN column.

Figure 19:
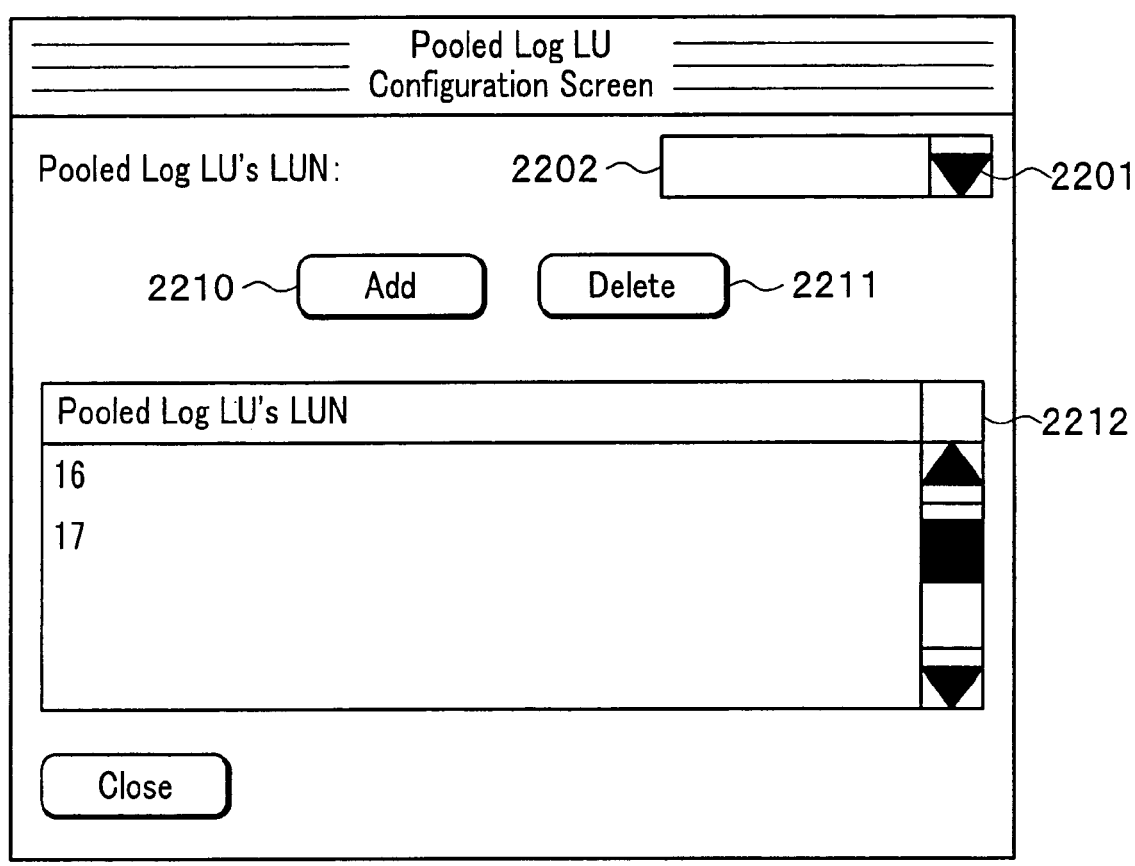
FIG. 19 is a drawing exemplifying a pooled log LU configuration screen of the third embodiment.

Next will be described an update procedure of the pooled LU 133. FIG. 19 is a drawing exemplifying a pooled log LU configuration screen (LU table update screen) of the third embodiment.

If the storage management device 2 receives a display instruction of the pooled log LU configuration screen from an administrator of the storage device 1 by the mouse 206 and the like, the CPU 204 builds up a table read request for reading all of LUNs of the pooled log LU 133 from the LUN table 121, based on the table management program 212, and transmits the table read request to the storage device 1.

In addition, the CPU 204 builds up a table read request for reading LUNs of all of the normal LUs 131 from the LUN table 121, based on the table management program 212, and transmits the table read request to the storage device 1.

If the CPU 204 receives a response to the requests from the storage device 1, it displays the pooled log LU configuration screen in the display 205, based on the GUI control program 211.

In an area 2212 of FIG. 19 are displayed the LUNs of the polled log LU 133 read from the LU table 121. Here, if a button 2201 is selected by the mouse 206 and the like, the CPU 204 displays a list of LUNs of unused normal LUs 131 read from the LU table 121 as a pull-down menu, based on the GUI control program 211. Here, if a LUN is selected by the mouse 206 and the like, the CPU 204 displays the LUN in an area 2202.

Then, if a button 2210 is selected by the mouse 206 and the like, the CPU 204 builds up a table update request for changing an LU type of a record, which corresponds to the LUN selected by the button 2201, to "pooled log LU" in the LU table 121, based on the table management program 212, and transmits the table update request to the storage device 1.

In addition, the CPU 204 adds a row to the area 2212, based on the GUI control program 211.

On the other hand, if a button 2211 is selected after one row of the area 2212 is selected by the mouse 206 and the like, the CPU 204 builds up a table update request for changing a use state of the record, which corresponds to the row selected within the area 2212, to "unused state" and the LU type to "normal LU" in the LU table 121, based on the table management program 212, and transmits the table update request to the storage device 1.

In addition, the CPU 204 deletes the selected row from the area 2212, based on the GUI control program 211.

Thus the administrator of the storage device 1 can configure the pooled log LU 133 (update the LU table 121) by the storage management device 2.

Next will be described access log writing processing performed by the CPU 104, based on the log management program 111, using FIG. 20 while referring to FIGS. 1 to 19. FIG. 20 is a flowchart showing authentication log writing processing of the storage device 1 of the third embodiment.

Because processing contents of S2301 and S2302 in FIG. 20 are same as those of the S1201 and the S1202 in FIG. 12, a description thereof will be omitted and that of S2303 will be described at first.

In the S2303 the CPU 104 searches the LUN relation table 123, and specifies a LUN of the log LU 132 and the pooled log LU 133 corresponding to the normal LU 131 which is an access object. S2304 will be described later. Next, the CPU 104 determines whether or not there exists a vacant log storage area in any of LUs (the log LU 132 and the pooled log LU 133) which has the specified LUN (S2305).

Here, if the CPU 104 determines that there exists the vacant log storage area in the LU (the log LU 132 or the pooled log LU 133) which has the specified LUN in the S2303 (Y in the S2305), it writes an authentication log in the vacant log storage area (S2306), and ends the authentication log writing processing.

On the other hand, if the CPU 104 determines that there exists no vacant log storage area in the LU (the log LU 132 or the pooled log LU 133) which has the specified LUN in the S2303 (N in the S2305), it searches an unused pooled log LU 133 in the LU table 121 (S2307).

Here, if the CPU 104 determines that there exists the unused pooled log LU 133 through the search of the LU table 121 (Y in S2308), it selects one record corresponding to the unused pooled log LU 133 from the LU table 121, and changes the use state of the record to "used" (S2309). Then the CPU 104 registers a relation between the normal LU 131 which is the access object and the pooled log LU 133 in the LUN relation table 123 (S2310). In other words, the CPU 104 adds the record consisting of the LUN of the normal LU 131 and that of the pooled log LU 133 selected in the S2309 to the LUN relation table 123.

Then the CPU 104 writes the authentication log in the log storage area of the pooled log LU 133 selected in the S2309 (S2311), and ends the authentication log writing processing.

On the other hand, if the CPU 104 determines that there exists no unused pooled log LU 133 in the LU table 121 (N in the S2308), it overwrites the authentication log in a log storage area where an oldest access log of the log LU 132 is stored (S2313). In other words, the CPU 104 overwrites the authentication log in a log storage area where an access log is already written in the specified LU (the log LU 132 or the pooled log LU 133) which is the specified LUN in the S2303, and ends the authentication log writing processing.

In addition, same as in the embodiments, when the CPU 104 overwrites the authentication log in the log LU 132 or the pooled log LU 133, it may notify (transmit) the storage management device 2 of overwriting the authentication log (S2312).

Meanwhile, although here is described the authentication log writing processing, the CPU 104 also similarly performs operation log writing processing and communication error log writing processing.

Furthermore, in the S2303, after the CPU 104 specifies the LUs (the log LU 132 and the pooled log LU 133) corresponding to the normal LU 131 which is the access object, it may perform the expiration check processing (S2304) for the LUs as in the first embodiment (see the S1204 in FIG. 11).

Here will be described the expiration check processing at this time, using FIG. 21 while referring to FIGS. 1 to 20.

FIG. 21 is a flowchart showing access log expiration check processing of the storage device 1 of the third embodiment.

Firstly, the CPU 104 reads an access log creation time from a head log storage area of access log of the log LU 132 or the pooled log LU 133 according to the same procedures as those of the S1301 to S1303 (S2401). Then the CPU 104 checks whether or not the access log exceeds a preservation period thereof same as in the S1304 (S2404), and deletes the access log that exceeds the preservation period from the log storage area (S2405).

In S2406 the CPU 104 determines whether or not the log storage area, where the access log is deleted in the S2404, exists in the pooled log LU 133 and all of log storage areas of the pooled log LU 133 are in a vacant state (S2406). In other words, the CPU 104 determines whether or not the pooled log LU 133, whose all of the log storage areas have become vacant, becomes into existence by deleting the access log in the S2405.

Then, if the CPU 104 determines that the log storage area where the access log is deleted in the S2404 is not in the pooled log LU 133 or there exists a log storage area not vacant in the pooled log LU 133, it proceeds to S2409 (N in the S2406). On the other hand, if the CPU 104 determines that in the pooled log LU 133 there exists a log storage area where the access log is deleted in the S2404 in the pooled log LU 133 and all of the log storage areas of the pooled log LU 133 are in a vacant state (Y in the S2406), it deletes a record representing a relation between the normal LU 131 and the pooled log LU 133 from the LUN relation table 123 (S2407).

In addition, the CPU 104 changes the LU table 121 so that a use state of the pooled log LU 133 of which all of log storage areas become a vacant state becomes "not used" (S2408). Then, if the CPU 104 has checked all of the log storage areas (Y in the S2409), that is, the CPU 104 has performed the processing of the S2404 to S2408 for all of the log storage areas of the log LU 132 and the pooled log LU 133, it ends the expiration check processing. On the other hand, if there exists a log storage area not checked yet (N in the S2409), that is, there exists a log storage area that the CPU 104 has not performed the processing of the S2404 to S2408, it reads an access log creation time from the next log storage area, and returns to the processing of the S2404 (S2410).

The CPU 104 may also perform the expiration check processing of the pooled log LU 133 at every predetermined period or when it writes an access log in the log LU 132.

Thus the storage device 1 can write an access log in the pooled log LU 133 when there exists no log storage area in the log LU 132. In other words, the storage device 1 can allocate an LU from the pooled log LU 133 for writing a log. In addition, if the log storage area of the LU allocated from the pooled log LU 133 becomes vacant, the storage device 1 can return the LU to the pooled log LU 133.

Fourth Embodiment

Next will be described a fourth embodiment of the present invention. The fourth embodiment is characterized in that when there is a read request from the host 4 for any of the log LUs 132, the storage device 1 performs authorization processing. To components similar to those of the embodiments are appended the same symbols, and a description thereof will be omitted.

Meanwhile, a general configuration of a computer system comprising the storage device 1 may be such one as in FIG. 1 or one comprising the move destination storage management device 3 as in FIG. 14.

Here will be described the storage device 1 of the fourth embodiment, referring to FIGS. 1 to 21 as needed. Although a configuration of the storage device 1 of the fourth embodiment is same as that of the first, second, and third embodiments (see FIG. 2), it is characterized in that an access control table (third information)127 is used for indicating a log type that each user can read.

FIG. 22 is a drawing exemplifying the access control table 127 of the fourth embodiment. The access control table 127 of FIG. 22 indicates a user ID, and a LUN and log type of the normal LU 131 of which access logs the user can access. For example, in FIG. 22 second and third rows indicate that the user whose user ID is "suzuki" can read an "operation log" and a "communication error log" out of access logs of the normal LU 131 of which LUN is "0". In addition, a fourth row indicates that the user whose user ID is "tanaka" can read an "authentication log" regarding all of used normal LUs 131.

Next will be described an update procedure of the access control table 127. FIG. 23 is a drawing exemplifying an access control configuration screen (access control table update screen) of the fourth embodiment.

If the storage management device 2 receives a display instruction of the access control configuration screen from an administrator of the storage device 1 by the mouse 206 and the like, the CPU 204 builds up a table read request for reading user IDs and all pairs of LUNs and log types of the normal LU 131 from the access control table 127, based on the table management program 212, and transmits the table read request to the storage device 1.

In addition, the CPU 204 builds up a table read request for reading all user IDs from the authentication table 125, based on the table management program 212, and transmits the table read request to the storage device 1.

Furthermore, the CPU 204 builds up a table read request for reading all LUNs of the normal LU 131 from the LUN relation table 123, based on the table management program 212, and transmits the table read request to the storage device 1.

If the CPU 204 receives a response to the requests from the storage device 1, it displays the access control configuration screen in the display 205, based on the GUI control program 211.

In an area 2622 of FIG. 23 is displayed information read from the access control table 127. Here, if a button 2601 is selected by the mouse 206 and the like, the CPU 204 displays a list of the user IDs read from the authentication table 125 as a pull-down menu, based on the GUI control program 211. Here, if a predetermined user ID is selected by the mouse 206 and the like, the CPU 204 displays the user ID in an area 2602.

In addition, if a button 2603 is selected by a user, the CPU 204 displays a list of LUNs of the normal LU 131 read from the LUN relation table 123 as a pull-down menu, based on the GUI control program 211. Then, if a predetermined LUN is selected by the mouse 206 and the like, the CPU 204 displays the LUN in an area 2604.

Meanwhile, if a check box of an area 2605 is checked, the CPU 204 selects all of the normal LUs 131 as an object allowed to be read.

In addition, check boxes of areas 2607 to 2609 receive selection input of log types (an authentication log, an operation log, and a communication error log) allowed to be read. For example, FIG. 23 shows that an "authentication log" is selected as a log type allowed to be read.

Here, if the buttons 2601 and 2603 are selected by the mouse 206 and the like, the areas 2607 to 2609 are checked, and thereafter a button 2620 is selected, the CPU 204 builds up a table update request for adding a record to the access control table 127 according to data selected by the buttons 2601 and 2603 and a presence or absence of a check of the areas 2605, and 2607 to 2609, based on the table management program 212, and transmits the table update request to the storage device 1.

In addition, the CPU 204 adds a row to the area 2622, based on the GUI control program 211.

On the other hand, if a button 2621 is selected after one row of the area 2622 is selected by the mouse 206 and the like, the CPU 204 builds up a table update request for deleting a record from the access control table 127, based on the table management program 212, and transmits the table update request to the storage device 1.

In addition, the CPU 204 deletes the selected row from the area 2622, based on the GUI control program 211.

Thus the administrator of the storage device 1 can perform the update of the access control table 127.

If the storage device 1 receives an access from the host 4 to the log LU 132, it reads information of the access control table 127 and transmits a predetermined type of an access log to the host 4 out of access logs stored in the log LU 132. For example, although if an access from the host 4 is from user ID "suzuki", the operation log and communication error log of LUN "0" are allowed to be read, another access log (authentication log) and the like are adapted not to be read.

Figure 24:
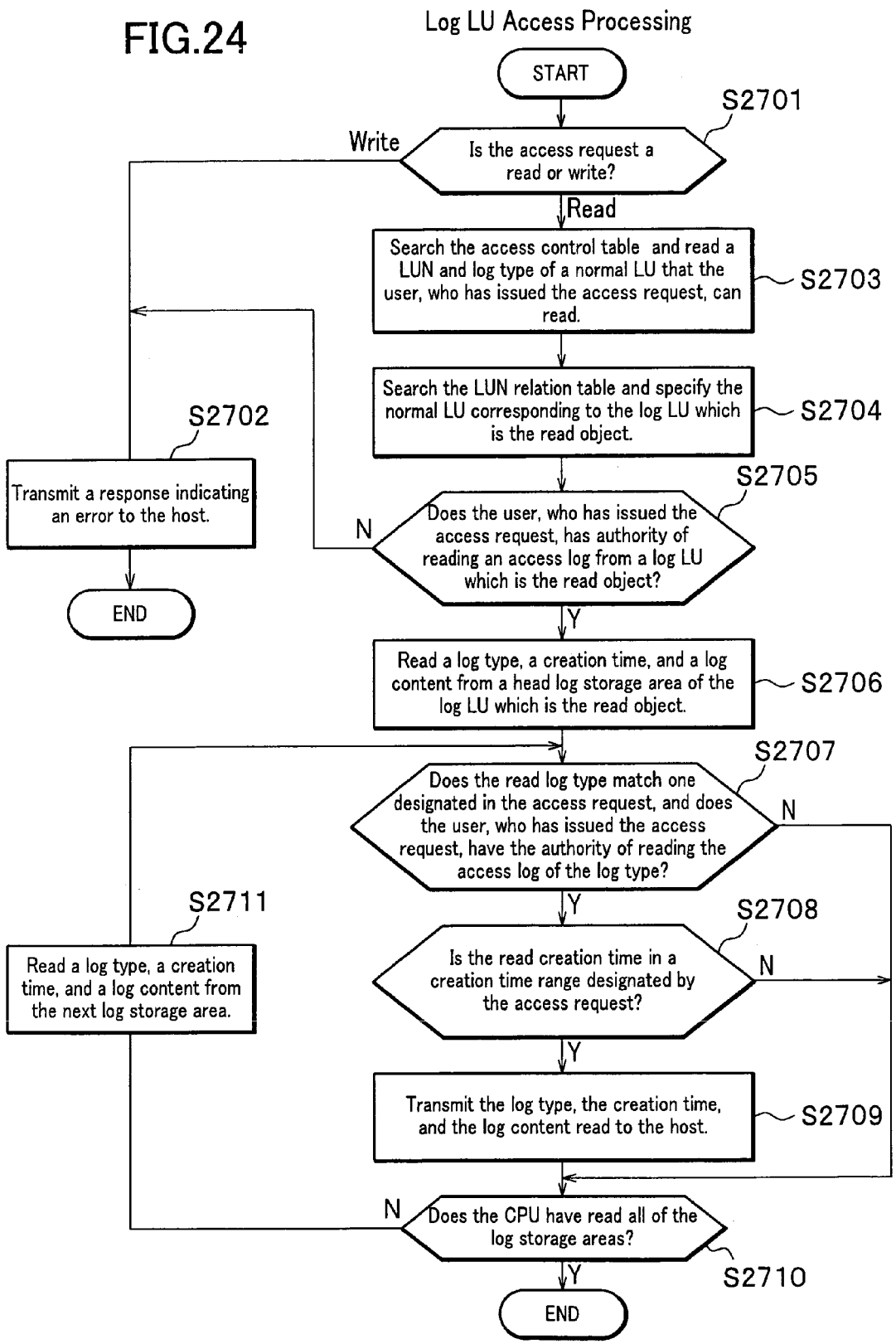
FIG. 24 is a flowchart showing log LU access processing of a storage device of the fourth embodiment.

Here will be described log LU access processing then, using FIG. 24 while referring to FIGS. 1 to 23. FIG. 24 is a flowchart showing log LU access processing of storage device 1 of the fourth embodiment.

Because a processing content of S2701 is similar to the processing of the S1401 in FIG. 13, a description thereof will be omitted and that of S2703 will be described at first.

The CPU 104 receives an access request (log read request) comprising information, a user ID, and the like regarding the log LU 132 which is a read object from the host 4 through the port 108. The CPU 104 searches the access control table 127 using the user ID comprised in the access request as a key, and reads the LUN and log type of the normal LU 131 that the user, who has issued the access request, can read (access) from the access control table 127 (S2703).

Next, the CPU 104 searches the LUN relation table 123, based on information of the log LU 132 comprised in the access request, and specifies the normal LU 131 corresponding to the log LU 132 (S2704).

Then the CPU 104 determines whether or not the user, who has issued the access request, has an authority of reading the access log from the log LU 132 which is the read object (S2705). Here, if the CPU 104 determines that the user, who has issued the access request, has not the authority of reading the access log from the log LU 132 which is the read object (N in the S2705), that is, the normal LU 131 corresponding to the log LU 132 that the user requests to read is not comprised in the normal LU 131, which is read in the S2703 and which the user can access, the CPU 104 transmits a response indicating an error to the host 4 (S2702).

On the other hand, if the CPU 104 determines that the user, who has issued the access request, has the authority of reading the access log from the log LU 132 which is the read object (Y in the S2705), that is, the normal LU 131 corresponding to the log LU 132 that the user requests to read is the normal LU 131, which is read in the S2703 and which the user can access, the CPU 104 reads a log type, a creation time, and a log content from a head log storage area of the log LU 132 which is the read object (S2706).

Next, the CPU 104 determines whether or not the log type read in the S2706 matches one designated in the access request, and whether or not the user, who has issued the access request, has the authority of reading the access log of the log type (S2707). In other words, the CPU 104 determines whether or not the log type read in the S2706 matches one designated in the access request and read in the S2703.

Here, if the CPU 104 determines that the log type read in the S2706 matches one designated in the access request and that the user, who has issued the access request, has the authority of reading the access log of the log type (Y in the S2707), it proceeds to S2708. Because processing contents of S2708 to S2711 are same as those of the S1405 to S1408 in FIG. 13, a description thereof will be omitted.

Thus in the storage device 1 only a user having the authority of reading the access log of the log type can read the access log. In other words, it is enabled for a third party not to unjustly read the access log of the storage device 1.

In addition, although in the embodiments the storage device 1 and the storage management device 2 are described as separate, the storage device 1 may build in the function of the storage management device 2. In other words, the involatile memory 100 of the storage device 1 may store the GUI control program 211; the administrator of the storage device 1 may input various pieces of information, using the mouse 206 and the keyboard 207 connected thereto; while watching a screen to accordingly be displayed, perform various configurations of the storage device 1; and perform a read of an access log. Also at this time it is preferable to store the failure log 221 in a device other than the storage device 1.

The control device 107 related to the embodiments can be realized by the log management program 111 for performing the processing described above, and it is enabled to memorize and provide the program 111 in a memory medium (CD-ROM and the like) readable by a computer. In addition, it is also enabled to provide the program 111 through a network such as Internet.

Thus, although the embodiments of the present invention are described, the invention is not limited thereto and various variations are available without departing from the spirit and scope of the invention.

What is claimed is:

1. A memory device system comprising:
   a memory device comprising a first memory unit for storing data, and a second memory unit for storing an access log regarding an access to said first memory unit;
   a port for inputting and outputting data; and
   a control device for writing said access log in a memory area of the second memory unit other than a memory area, where said access log is already written, if an access request to said first memory unit is inputted through said port and said access log is written in said second memory unit according to said access request, and for prohibiting a write in said second memory unit if an information write request in said second memory unit is inputted through said port.

2. A memory device system according to claim 1, wherein said access request is an operation request, an authentication request, and a communication request for said first memory unit, and wherein said access log is an operation log regarding an operation to said first memory unit; an authentication log regarding success or failure of an authentication; and a communication error log regarding a communication error.

3. A memory device system according to claim 1, wherein said control device reads identification information of a memory unit which is an access destination included in said access request inputted in said port and determines whether said access request is for said first memory unit or said second memory unit.

4. A memory device system according to claim 3, wherein for every identification information of a memory unit which is an access destination, said control device stores first information in a memory unit of said control device, said first information indicating whether the memory unit of the access destination is said first memory unit or said second memory unit; and in determining whether or not said access request is for said first memory unit or said second memory unit, said control device reads said first information.

5. A memory device system according to claim 4, wherein said memory device comprises not less than one third memory unit, and wherein when a writable area becomes less than a predetermined threshold value in said second memory unit, said control device selects a third memory unit, where an access log is not written, from said not less than one third memory unit and writes said access log in the selected third memory unit.

6. A memory device system according to claim 5, wherein said control device comprises information, which indicates that said memory unit is said third memory unit, and information, which indicates whether or not an access log is already written in said third memory unit, in said first information, and wherein when selecting said third memory unit, said control device refers to and renews said first information.

7. A memory device system according to claim 1, wherein if a writable area in each memory unit of said memory device becomes less than a predetermined threshold value, said control device stores said access log memorized in said second memory unit in a memory device outside said memory device system through said port and deletes said access log memorized in said second memory unit.

8. A memory device system according to claim 1, wherein when storing said access log in said second memory unit, said control device stores information regarding a type of said access log and a current time; and according to a preservation period of said access log designated for every type of said access log, said control device further deletes an access log, which exceeds the preservation period, out of access logs memorized in said second memory unit.

9. A memory device system according to claim 8, wherein said control device stores second information in a memory unit of said control device, said second information indicating a preservation period of said access log according to every type of said access log, and wherein when deleting an access log exceeding said preservation period, said control device reads said second information.

10. A memory device system according to claim 1, wherein if there exists no writable area in each of said first and second memory units, said control device overwrites an access log in an area where an oldest access log is memorized out of access logs memorized in said second memory unit.

11. A memory device system according to claim 1, wherein said port receives a read request comprising a user ID which is user's identification information from an external device, and wherein said control device reads an access log of a type allowed to be read by said user, and transmits said read access log through said port.

12. A memory device system according to claim 11, wherein said control device stores third information in a memory unit of said control device, said third information indicating a type of an access log allowed to be read by said user for every user ID, and wherein when reading the access log of the type allowed to be read by said user, said control device reads said third information.

13. A memory device system according to claim 1, wherein said control device transmits a failure log regarding a failure of said memory device.

14. A storage device comprising:
   a disk device comprising a normal LU for storing data, and a log LU for storing an access log regarding an access to said normal LU;
   a port for inputting data received through a network and outputting data through said network; and
   a control device that writes said access log in a memory area of said log LU other than a memory area where said access log is already written in said log LU if an access request to said normal LU from an external device is inputted through said port and said access log is written in said log LU according to said access request, and that prohibits a write in said log LU if a write request is input in said log LU through said port from an external device.

15. A storage device according to claim 14, said control device comprising:
   an involatile memory;
   a calculation processing unit for performing various pieces of calculation processing, based on a program memorized in said involatile memory;
   a main memory which is a memory area used in performing the calculation processing;
   an iSCSI processing unit for transmitting and receiving an iSCSI packet to/from an external device through an IP network; and
   an input/output interface with said disk device,
   wherein said involatile memory stores an authentication table indicating a password for performing authentication of said external device for every identification information of said external device, an LU table indicating whether an LU is said normal LU or said log LU for every identification information of said LU, a LUN relation table indicating identification information of a log LU for storing an access log of said normal LU for every identification information of said normal LU, a log type table indicating a type and preservation period of an access log to be recorded for every said normal LU, a path table indicating an iSCSI name of a device communicable with said normal LU for every said normal LU, and a log management program which said calculation processing unit runs based on, and
   wherein said log management program comprises a portion for determining whether information inputted through said iSCSI processing unit is an access request to said normal LU or said log LU; a portion that reads said authentication table, said path table, an iSCSI name included in said access request, and identification information and password of said external device, and performs authentication processing for a device transmitting said access request, if said determination portion determines that information inputted through said iSCSI processing unit is the access request to said normal LU; a portion for performing communications between said external device and said normal LU if said authentication processing is normally performed; a portion for specifying a log LU where said access log is to be written; a portion for writing said access log in an area of said specified log LU other than a memory area where said access log is already written; and a portion for prohibiting a write in said log LU if the determination portion determines that information inputted through said iSCSI processing unit is the access request to said log LU and an information write request for said log LU.

16. A log recording method in a memory device system comprising a memory device, a port for inputting and outputting data, and a control device for controlling said memory device, the method comprising the steps of:
   allowing a first memory unit comprised in said memory device to store data, and a second memory unit comprised therein to store an access log regarding an access to said first memory unit; and
   allowing said control device to write said access log in a memory area of said second memory unit other than a memory area where said access log is already written according to an access request to said first memory unit inputted through said port, and to prohibit a write in said second memory unit if an information write request in said second memory unit is inputted through said port.

* * * * *